US012570274B2

(12) United States Patent
Sharma Banjade et al.

(10) Patent No.: US 12,570,274 B2
(45) Date of Patent: Mar. 10, 2026

(54) INFRASTRUCTURE-BASED COLLABORATIVE AUTOMATED PARKING AND LOCATION MANAGEMENT

(71) Applicant: Intel Corporation, Santa Clara, CA (US)

(72) Inventors: Vesh Raj Sharma Banjade, Portland, OR (US); S M Iftekharul Alam, Hillsboro, OR (US); Arvind Merwaday, Beaverton, OR (US); Satish Chandra Jha, Portland, OR (US); Kathiravetpillai Sivanesan, Portland, OR (US); Kuilin Clark Chen, Portland, OR (US); Francesc Guim Bernat, Barcelona (ES); Kshitij Arun Doshi, Tempe, AZ (US); Leonardo Gomes Baltar, Munich (DE); Suman A. Sehra, Folsom, CA (US); Soo Jin Tan, Shanghai (CN); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 18/572,548

(22) PCT Filed: Sep. 24, 2021

(86) PCT No.: PCT/CN2021/120201
§ 371 (c)(1),
(2) Date: Dec. 20, 2023

(87) PCT Pub. No.: WO2023/044721
PCT Pub. Date: Mar. 30, 2023

(65) Prior Publication Data
US 2025/0128698 A1 Apr. 24, 2025

(51) Int. Cl.
*B60W 30/06* (2006.01)
*B60L 53/36* (2019.01)
(Continued)

(52) U.S. Cl.
CPC ............. *B60W 30/06* (2013.01); *B60L 53/36* (2019.02); *B60L 53/63* (2019.02); *B60L 55/00* (2019.02);
(Continued)

(58) Field of Classification Search
None
See application file for complete search history.

(56) References Cited

U.S. PATENT DOCUMENTS 11,132,649 B2 9/2021 Ma et al.
11,710,094 B2 * 7/2023 Kim ................. G06Q 10/08355
705/332
(Continued)

FOREIGN PATENT DOCUMENTS

AU 2015201047 A1 * 3/2015
CN 106997684 A 8/2017
(Continued)

OTHER PUBLICATIONS

"International Application Serial No. PCT/CN2021/120201 International Search Report mailed May 20, 2022", 3 pgs.
(Continued)

*Primary Examiner* — Shelley Chen
(74) *Attorney, Agent, or Firm* — Schwegman Lundberg & Woessner, P.A.

(57) ABSTRACT

Systems and techniques for location management are described herein. In an example, a system may include at least one processor and at least one memory with instructions stored thereon that when executed by the processor, cause the processor to obtain data originating from one or
(Continued)

more sensors proximate to the location. A trained activity-based detection model may identify an activity at the location and perform a determination of a service to be offered at the location based on the detected activity. The system may then send a message to a user offering the service to the user, and in response to receiving an authorization accepting the service from the user, cause the service to be implemented at the location, which may include classifying the service as a service type, matching the service type to a service provider, and sending a notification to the service provider.

20 Claims, 22 Drawing Sheets

(51) Int. Cl.

| | |
|---|---|
| *B60L 53/63* | (2019.01) |
| *B60L 55/00* | (2019.01) |
| *G06Q 20/40* | (2012.01) |
| *G06Q 30/0283* | (2023.01) |
| *G08G 1/0967* | (2006.01) |
| *G08G 1/14* | (2006.01) |

(52) U.S. Cl.
CPC ..... *G06Q 20/4015* (2020.05); *G06Q 30/0284* (2013.01); *G08G 1/096725* (2013.01); *G08G 1/14* (2013.01); *B60W 2556/45* (2020.02)

(56) References Cited

U.S. PATENT DOCUMENTS

| | | | | |
|---|---|---|---|---|
| 2014/0136443 | A1 * | 5/2014 | Kinsey, II | G06Q 10/063116 |
| | | | | 705/347 |
| 2015/0294567 | A1 | 10/2015 | De La Plaza Ortega | |
| 2016/0117866 | A1 | 4/2016 | Stancato et al. | |
| 2018/0315146 | A1 * | 11/2018 | Matthiesen | G06Q 10/06315 |
| 2019/0011931 | A1 * | 1/2019 | Selvam | G05D 1/0088 |
| 2019/0376801 | A1 * | 12/2019 | Whitt | B60Q 1/444 |
| 2020/0272950 | A1 | 8/2020 | Xu et al. | |
| 2020/0400457 | A1 * | 12/2020 | Lambert | B62J 45/20 |
| 2021/0014678 | A1 * | 1/2021 | Seagraves | G06Q 50/40 |
| 2023/0009869 | A1 * | 1/2023 | Hellgren | G06Q 10/20 |

FOREIGN PATENT DOCUMENTS

| | | | | | |
|---|---|---|---|---|---|
| CN | 107945566 | A | | 4/2018 | |
| CN | 111868762 | A | | 10/2020 | |
| CN | 112559858 | A | * | 3/2021 | G06N 3/045 |
| CN | 215971139 | U | * | 3/2022 | |
| CN | 114846484 | A | * | 8/2022 | G06Q 10/20 |
| JP | 2020046724 | A | * | 3/2020 | |
| JP | 7239534 | B2 | * | 3/2023 | |
| KR | 101603765 | B1 | * | 3/2016 | G08G 1/14 |
| KR | 102226533 | B1 | * | 3/2021 | H05B 47/115 |
| KR | 20210096989 | A | * | 8/2021 | G07C 9/00309 |
| KR | 20220075918 | A | * | 6/2022 | G06Q 30/0283 |
| WO | WO-2016126421 | A1 | * | 8/2016 | G06Q 10/06 |
| WO | WO-2023044721 | A1 | | 3/2023 | |

OTHER PUBLICATIONS

"International Application Serial No. PCT/CN2021/120201 International Written Opinion mailed May 20, 2022", 4 pgs.

"European Application Serial No. 21957856.4, Extended European Search Report mailed Mar. 24, 2025", 12 pgs.

"European Application Serial No. 21957856.4, Response filed Aug. 28, 2025 to Extended European Search Report mailed Mar. 24, 2025", W/ English Claims, 12 pgs.

Mahoor, Mohsen, et al., "State-of-the-art in smart streetlight systems: a review", IET Smart Cities, The Institution of Engineering and Technology, Michael Faraday House, Six Hills Way, Stevenage, Herts. SG1 2AY, UK, vol. 2, No. 1, (Mar. 1, 2020), 24-33.

Raveendran, Visal, et al., "Vehicle-to-grid transactions and shunt active filtering capability of SmartParks equipped with modified ICosF contr", IEEE Students' Conference on Electrical, Electronics and Computer Science, IEEE, (Mar. 1, 2014), 1-7.

* cited by examiner

AS: APP SERVER
SP: SERVICE PROVIDER
RTA: ROAD TRAFFIC AUTHORITY
VRU: VULNERABLE ROAD USER
V2X: VEHICLE-TO-EVERYTHING
OEM: ORIGINAL EQUIPMENT MANUFACTURER

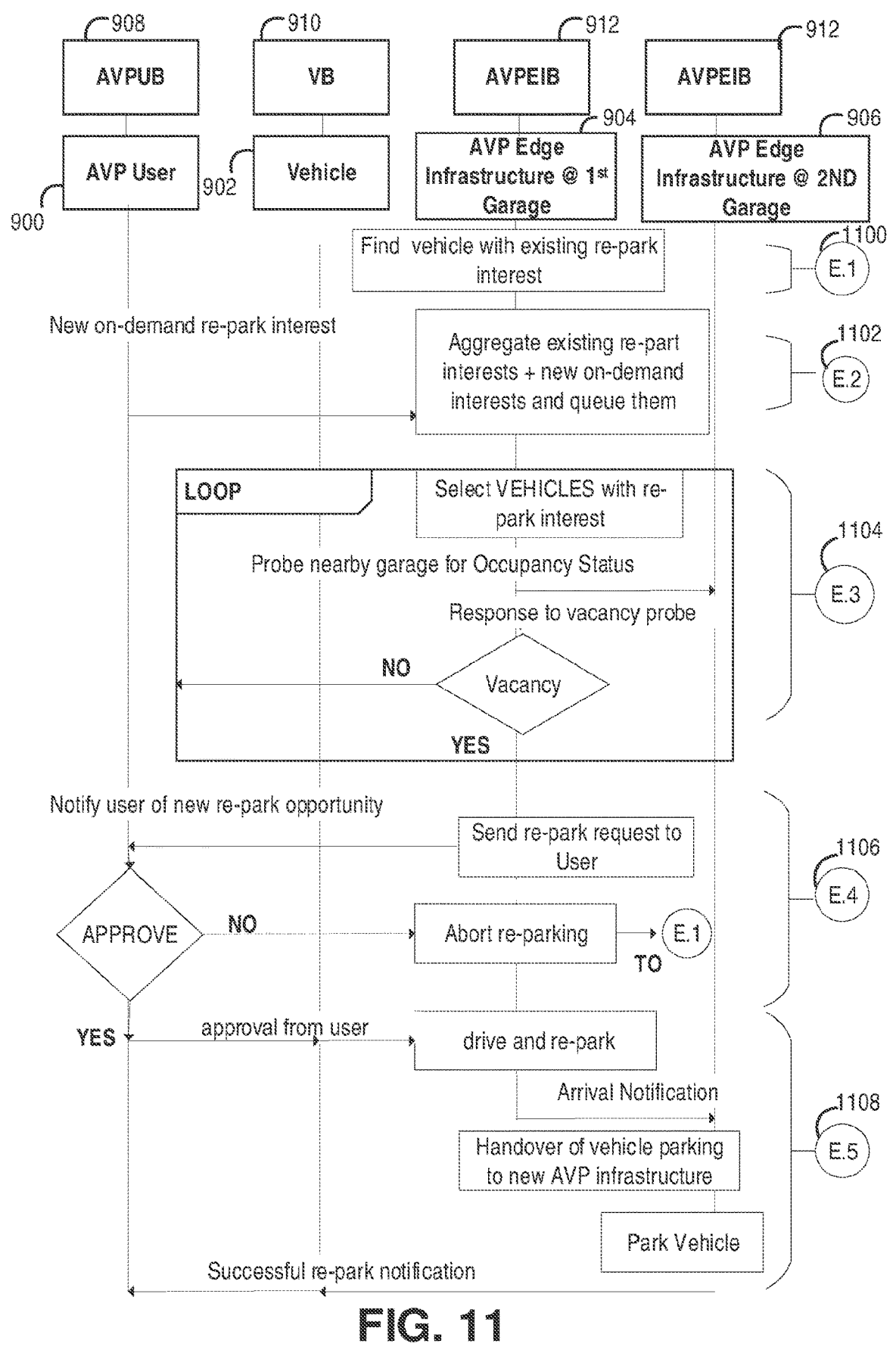

| 908 | 910 | 912 | 912 |
|---|---|---|---|
| AVPUB | VB | AVPEIB | AVPEIB |

| AVP User | Vehicle | AVP Edge Infrastructure @ 1st Garage | AVP Edge Infrastructure @ 2ND Garage |
|---|---|---|---|

900    902    904    906

Find vehicle with existing re-park interest — 1100 — E.1

New on-demand re-park interest

Aggregate existing re-part interests + new on-demand interests and queue them — 1102 — E.2

LOOP          Select VEHICLES with re-park interest

Probe nearby garage for Occupancy Status

Response to vacancy probe

Vacancy — NO / YES — 1104 — E.3

Notify user of new re-park opportunity

Send re-park request to User — 1106 — E.4

APPROVE — NO → Abort re-parking → E.1 TO

YES → approval from user → drive and re-park

Arrival Notification

Handover of vehicle parking to new AVP infrastructure — 1108 — E.5

Park Vehicle

Successful re-park notification

FIG. 11

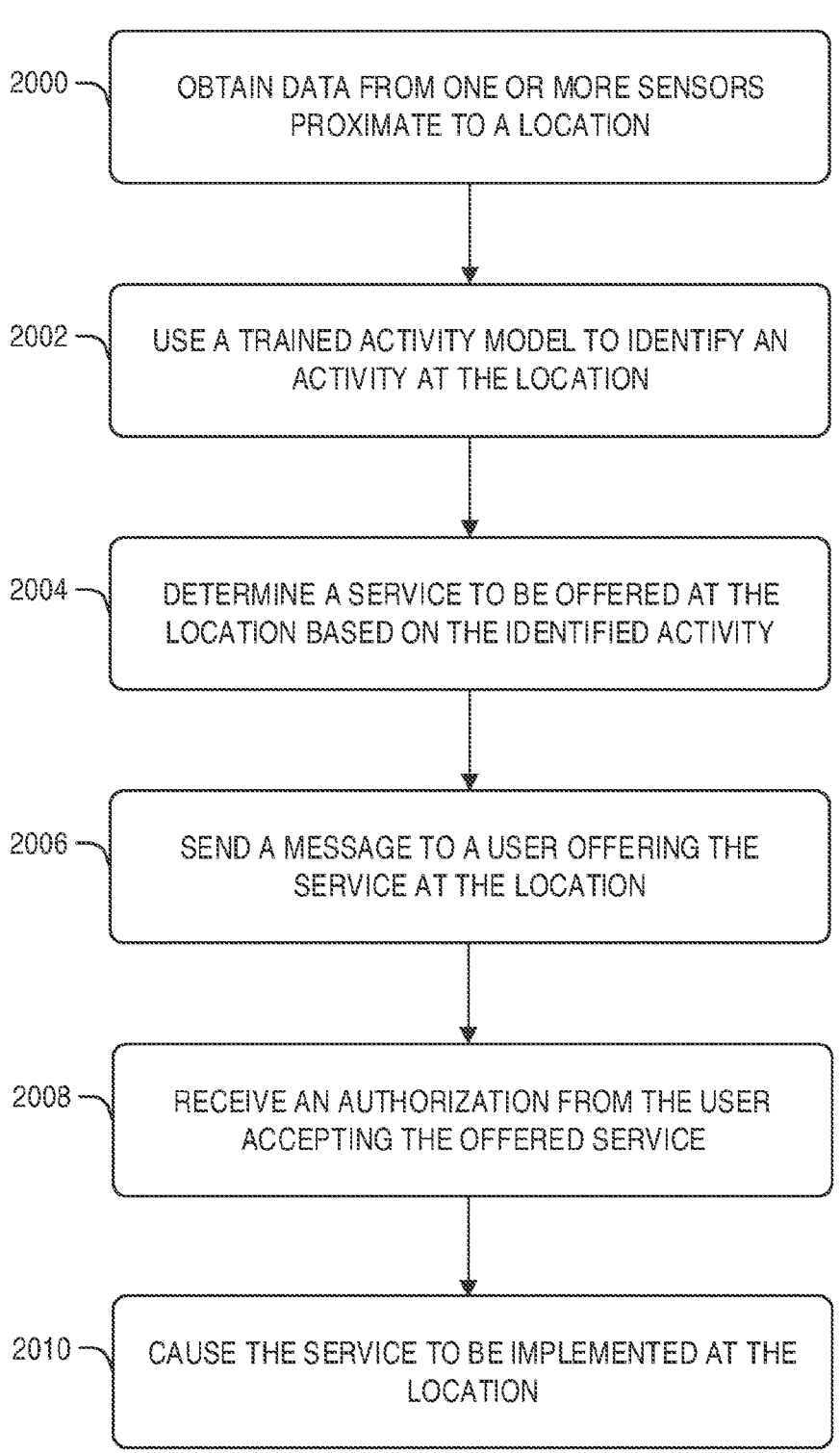

2000 — OBTAIN DATA FROM ONE OR MORE SENSORS PROXIMATE TO A LOCATION

2002 — USE A TRAINED ACTIVITY MODEL TO IDENTIFY AN ACTIVITY AT THE LOCATION

2004 — DETERMINE A SERVICE TO BE OFFERED AT THE LOCATION BASED ON THE IDENTIFIED ACTIVITY

2006 — SEND A MESSAGE TO A USER OFFERING THE SERVICE AT THE LOCATION

2008 — RECEIVE AN AUTHORIZATION FROM THE USER ACCEPTING THE OFFERED SERVICE

2010 — CAUSE THE SERVICE TO BE IMPLEMENTED AT THE LOCATION

FIG. 20

INFRASTRUCTURE-BASED COLLABORATIVE AUTOMATED PARKING AND LOCATION MANAGEMENT

This application is a U.S. National Stage Filing under 35 U.S.C. 371 from International Application No. PCT/CN2021/120201, filed on Sep. 24, 2021, and published as WO 2023/044721 on Mar. 30, 2023, which application is incorporated herein by reference in its entirety.

TECHNICAL FIELD

The present disclosure relates to a system for infrastructure-based collaborative location management, such as management of curbside spaces, parking areas, or the like, and managing services such as valet parking available at the location.

BACKGROUND

Management of spaces, such as curbside spaces (e.g., the space between city streets and sidewalks), parking lots, and parking ramps is very important for the future of urban mobility. With the expansion of internet/mobile/web-based applications that either fully or partially automate services (such as ride sharing applications, food delivery applications, or the like) such spaces, both public and private, used by members of the general public are being increasingly utilized. Management of these spaces is increasingly important for cities and businesses to optimize mobility and maximize revenue.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 11 illustrates an example flow diagram for a re-parking sequence, in accordance with some embodiments.

FIG. 20 illustrates an example of a diagram of a method for location management, in accordance with some embodiments.

DETAILED DESCRIPTION

Figure 1:
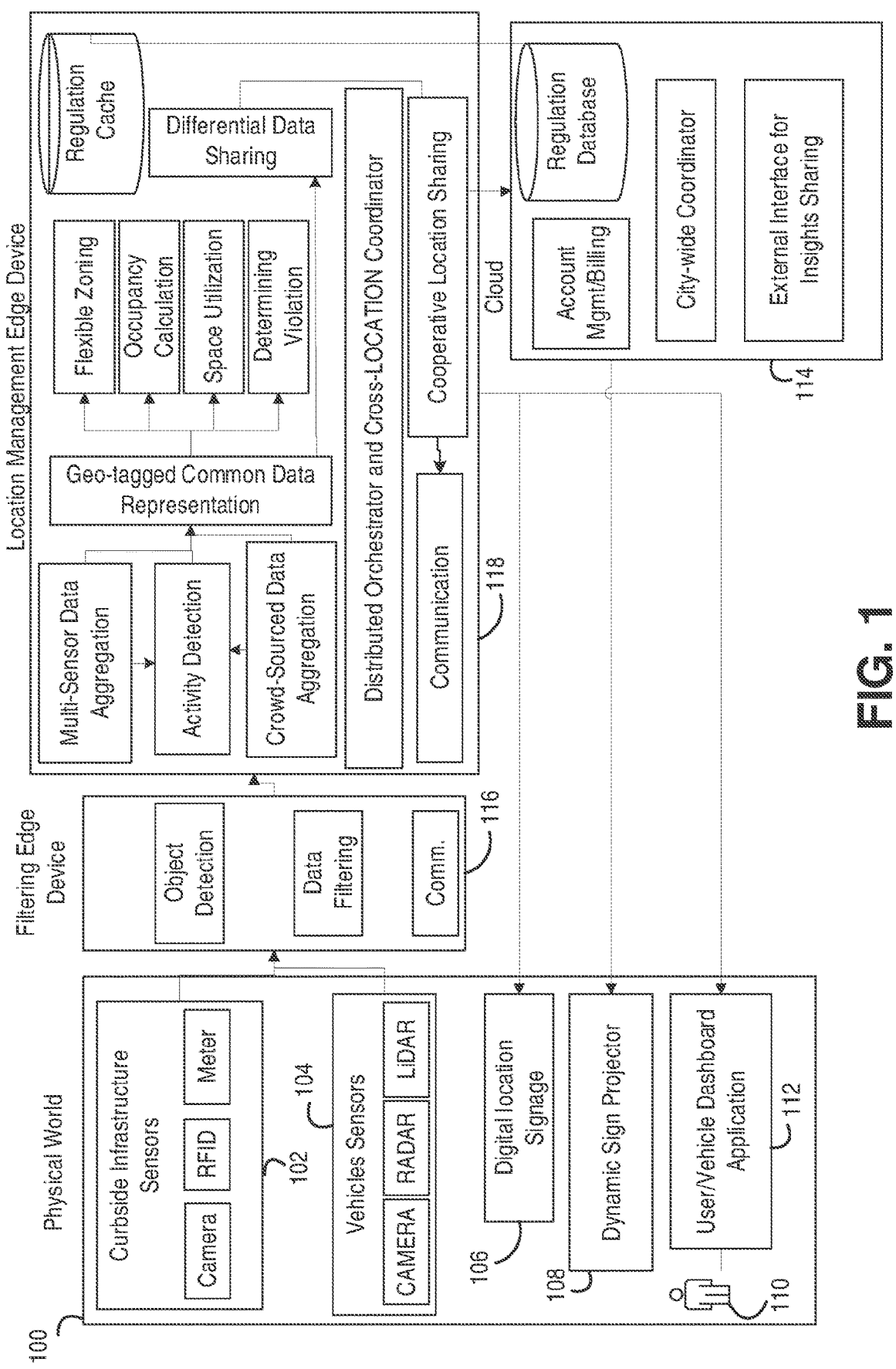
FIG. 1 illustrates an example framework for a location management system, in accordance with some embodiments.

Vehicle spaces used by members of the general public, public and private transport, such as curbside spaces, can be divided into various blocks assigned for functions such as passenger loading and unloading, commercial loading and unloading, bus stops, and on-street parking. Use of these spaces can be further regulated and managed by occupation time, size of vehicle, age or gender of users, or other aspects. Typical use of these spaces in cities (such as by busses, taxis, freight deliveries, bike lanes, parking, or the like) is ever expanding for services such as ride sharing. The physical locations are fixed, and traditional ways of managing these areas such as using fixed zones, complicated signage, manual modification to parking/loading policies, often with a human in the loop, can result in inefficient and subjective use of the spaces. Further, with the expansion of assisted and autonomous vehicles, services for new transportation modes such as electric vehicles, dockless vehicles, delivery robots, robotaxis, UAVs and drones, or the like, and services (e.g., vehicle charging, multimodal transport, passengers as well as goods) for these new transportation modes will require a need for the management of these spaces and/or services offered at these spaces to be either fully or partially automated.

Existing solutions exploring the management of these spaces lack a scalable management framework that handles sensor data capturing, efficient data communication and processing (such as at the edge), and updating digital signage or messaging (e.g., through an app, by an SMS/text message, or the like) to improve the experience of a person using the spaces. Thus, the future of management of these locations needs to be more dynamic or flexible depending on the demands, events occurring near the location, time of day, or the like. This flexibility requires intelligent management of data collection from the infrastructure located at or near the location, mobile sensors (e.g., sensors such as RADAR, LIDAR, cameras, or the like, located on vehicles), and communication-efficient interaction with edge compute devices, such as road-side units, to process/aggregate sensor data, as well as cross-curbside interactions for both computing resource and physical space sharing. Further, enforcement of geo-area specific regulation/policies and simpler interface to share real-time information on curbside usage with users is needed.

Disclosed herein are systems and methods for a networked computing device for location management. The system may include at least one processor, and memory, including instructions that cause the at least one processor to obtain data originating from one or more sensors proximate to a location. For example, sensors that are located within the infrastructure proximate to the location. The infrastructure may include a streetlight, street sign, bus shelter, or the like. The instructions can further cause the processor to identify, using a trained user model, an activity at a location, and perform a determination of a service to be offered at the location based on the identified activity. For example, the system may determine that someone is waiting in a valet parking pickup area and determine that the person needs to have his or her vehicle brought to the pickup area. Based on the determination, the system may send a message to the user offering the service at the location. For example, the system may send the user a message offering to have the individual's vehicle brought to the pickup area.

The system may then receive an authorization from the user accepting the offered service and, in response to the authorization accepting the offered service, cause the service to be implemented. To cause the service to be implemented may include classifying the service accepted by the user as a service type, matching the service type to a service provider, and sending a notification to the service provider, the notification including information regarding the location, an identifier assigned to the user, and the service type to be provided. For example, when the service to be provided is determined to be a valet service, the system may send a message to a valet attendant, informing the attendant of the location (e.g., the drop off point) and that the user's vehicle is to be brought to the location.

Management of spaces used by the general public, public and private transport, such as curbsides located on public streets, and parking areas such as surface parking lots, parking ramps, or the like, will be critical to the realization of future Intelligent Transportation Systems (ITS) for "smart cities" or "smart premises". The techniques discussed herein will bolster ITS solutions to enable future smart cites by providing efficient, dynamic, and scalable management of physical spaces in cites for emerging mobility services. A city can divide a location space, such as curbside space, into a number of "blocks" assigned for passenger loading, commercial loading, bus stops, on-street parking, or the like, as well as keeping a flexible zone that can be dynamically configured depending on factors such as demand for a type of service, time of day, nearby special events (e.g., a professional or college sporting event, a concert, a festival, or the like). The management of such a location space may be digitized by deploying smart sensors at the location which can be incorporated into infrastructure such as a streetlight, and leveraging crowd-sourced data from nearby sensors, such as sensors located on vehicles. The collected data may be processed at the edge (such as at road-side units) in a communication-efficient way.

The framework for intelligent location management may include dynamic linking of service requestors and service providers in a dense environment (e.g., a busy city space) via publisher-subscriber (pub-sub) and geo-scoped broadcast messages, which may contain fine-grained or coarse-grained information about the location space. The framework may also include history and context-based demand anticipation for the orchestration of computing and networking resources along a near-far-edge to cloud. The framework may also utilize deployment of one or more integrated infrastructure devices (e.g., video sensors, digital signage, cameras, or the like) to enable flexible zoning, filtering out unnecessary information, thus saving communication bandwidth, and providing display/communication interfaces for users of the location.

The framework may also include automated metering, determination of space, marking violations, or the like, using trained or untrained artificial intelligence (AI) or machine-learned (ML) based activity detection techniques and interface with a city authority (e.g., a local police department, a local fire department, emergency medical services, or the like) or a private service (e.g., a towing service, a valet parking service, a vehicle maintenance service, or the like) to dispatch help, file a report, request a service, or the like, as desired. The system may also utilize vehicle-to-infrastructure communication/hints (utilizing anonymized but certified by a trusted third-party) on expected behavior, route/trajectory, or intent of the vehicle, and leveraging such contextual information to have coordinated sharing of the location space.

Depending on the demand for the location space, the time of day, a particular day of the week, or the like, a "flexible zone" may be allocated for specific services. For example, at a typical start and end of the work/business day, the flexible zone may be allocated to the loading and unloading of passengers. At typical lunch or dinner times, the flexible zone may be allocated to food deliveries. Late in the evening, the flexible zone may be allocated to overnight parking. Further, any data collection and/or data processing done by sensors proximate to the location can be adjusted or paused as desired. For example, the frequency of collection of data from sensors may be increased while the flexible zone is being used for food delivery and decreased when it is being used for overnight parking. Use of digital signage at the location space may aid in the efficient management of the location space and ensure seamless coexistence between autonomous vehicles and non-autonomous vehicles, as more autonomous vehicles are used on a consistent basis.

FIG. 1 illustrates an example framework for a location management system, in accordance with some embodiments. In an example of the location management framework, in the physical world 100, one or more curbside infrastructure sensors 102 may be utilized. The one or more curbside infrastructure sensors 102 may include, one or more cameras, one or more radio-frequency identification (RFID) transmitters or receivers, one or more meters, or the like. The one or more curbside infrastructure sensors 102 may be located, attached to, incorporated into, or the like, a streetlight, a dedicated pole, a structure (e.g., a bus stop shelter), or the like, and configured to monitor the occupancy and activity at the location. The system may also capture crowd-sourced data from one or more other sensors located proximate to the location, such as one or more vehicle sensors 104 located on a vehicle proximate to the location space. The one or more vehicle sensors 104 may include one or more cameras, a RADAR, LIDAR, or the like. The one or more vehicle sensors 104 (or other similar sensors located proximate to the location space) may be used or employed as alternatives to the one or more curbside infrastructure sensors 102 or when the one or more curbside infrastructure sensors 102 lack sufficient coverage of at least a portion of the location space (e.g., when there is a "dead zone" in the location space not covered by the one or more curbside infrastructure sensors 102). In some cases, crowd-sourced data from the one or more vehicle sensors 104 may be the only data at the location space available to be captured by the system, for example, during a power-outage affecting the one or more curbside infrastructure sensors 102.

The system may employ one or more edge devices to perform the various functions of the location management system. For example, the data collected from the one or more curbside infrastructure sensors 102 and/or the one or more vehicle sensors 104 may be sent to an object detection and filtering edge device 116. The object detection and filtering edge device 116 may perform functions such as object detection to identify objects (e.g., people, vehicles, or the like) at the location and/or data filtering to retrieve information of interest (e.g., a vehicle looking to stop at the curbside, a person waiting for a taxi or ride-sharing service, or the like) and filter out information that is not of interest (e.g., a vehicle stopped at a stoplight, a person waiting to cross the street, or the like), so that only useful information is conveyed over wireless communication links.

In an example, the filtered data may be sent to a location management edge device 118, which may perform one or more location management functions on the filtered data. The location management edge device 118 may be a road-side unit (RSU) located near, proximate to, or the like, the location. The location management edge device 118 may have computing capabilities that the object detection and filtering edge device 116 does not. In an example, the location management edge device 118 may perform some or all of the functions of the object detection and filtering edge device 116, such as when the object detection and filtering edge device 116 cannot perform a function because of low bandwidth, low power, or another similar state that requires one or more functions to be offloaded.

The location management edge device 118 may perform functions such as aggregating data from the one or more curbside infrastructure sensors 102 and aggregating the crowd-sourced data, such as data collected from the one or more vehicle sensors 104. In an example, the data from the one or more curbside infrastructure sensors 102 and the crowd sourced data may be aggregated together by the location management edge device 118. In an example, the data aggregation may be used to combine the data from the one or more curbside infrastructure sensors 102 and the crowd-sourced data, or alternatively, to corroborate (using a majority voting algorithm) the crowd-sourced data.

The location management edge device 118 may also perform activity detection using an AI or ML to determine a type of activity occurring at the location, and based on the identified activity, the system may determine a service to be offered. For example, the system can identify the activity as a user 110 waiting for a taxi or arrival of a ride-sharing service to pick him or her up. Based on this identification, the system may contact the user 110 via a user/vehicle application 112 and offer to connect the user 110 with a ridesharing or taxi service. Additionally, or alternatively, if the user 110 has already set up a ride, the system may direct the user 110 to a portion of the location space to wait for the arrival of the taxi or the vehicle. Additionally, or alternatively, when the system determines that the user 110 has set up a ride, the system may connect with the vehicle via the user/vehicle application 112 and direct the vehicle to the portion of the location at which the user 110 is waiting to be picked up.

In an example, the aggregated data may be converted into a common geo-tagged format. The common geo-tagged format may map information on the location space with meta-information such as a timestamp, type of vehicles, type of activity, and relative location (e.g., a distance to a curbside) with respect to the overall location space. The aggregated data and/or the geo-tagged data may then be analyzed to implement several useful functions such as generation of an occupancy map, calculation of space utilization, determination of curbside policy violations, or the like by the location management edge device 118 to improve the utilization of curbside space and the experience of the user 110 or the service providers. The system may also allow for sharing of geo-tagged data with the cloud 114. The sharing of the geo-tagged data with the cloud 114 may be done so that the geo tagged data can be backed up in the cloud 114. Additionally, or alternatively, additional analysis of the geo-tagged data may be performed in the cloud 114, such as in a cloud-based server, so as to provide additional insights about the location space (e.g., number of passengers entering or leaving the space, duration of their time spent at the location space, or the like). Additionally, or alternatively, the system can determine changes or differences in any of the collected, aggregated, or geo-tagged data over time, and provide the information to the user 110, for example a user 110 who is an owner of a business located near the location space.

In an example, output from one or more of the functions performed by the location management edge device 118 may be conveyed, transmitted, or the like, to digital location signage 106. In an example, the digital location signage 106 may be a graphical user interface display at the location, such as a monitor included on a post, a bench, a kiosk, or the like, at the location. In an example the digital location signage 106 may be produced by a dynamic sign projector 108 capable of dynamically projecting a sign on a portion of the location (e.g., on a portion of the curb or the road/street next to the curb) such as a sign indicating an allowed vehicle type or marking the curb or road/street for an amount of space. In an example, projection of the digital location signage 106 onto pavement by the dynamic sign projector 108 in daylight, such as on a sunny day, may require the use of high-lumen lights/bulbs included in the dynamic sign projector 108. In such an example, the lights/bulbs may be turned off when the portion of the location space is occupied (e.g., when a delivery vehicle parks in the space) to save energy. In an example, the digital location signage 106 may be sent to or replicated on the user/vehicle application 112 located on a device owned by the user 110, such as a smartphone, or on an infotainment display in a vehicle on which the user/vehicle application 112 is installed.

In an example, one or more of the one or more curbside infrastructure sensors 102, one or more vehicle sensors 104, digital location signage 106, dynamic sign projector 108, vehicle application 112, object detection or filtering edge device 116, or location management edge device 118 may be communicatively coupled to the cloud 114 (e.g., a cloud server). In an example, one or more of the functions performed by the system, such as at the object detection or filtering edge device 116, or the location management edge device 118 may be offloaded to the cloud 114 such as when the object detection or filtering edge device 116 or the location management edge device 118 are not available or cannot perform one or more of the functions. In an example, functions such as account management and billing or city-wide coordination (e.g., contacting services such as police, EMS, towing, or the like) may be performed in the cloud 114. In an example, the cloud 114 may control the dynamic sign projector 108 or create the digital location signage 106, or cause messages to be sent to the user/vehicle application 112. In an example, the user/vehicle application 112 may provide the user 110 with a real-time status of the location space, manage notifications regarding his or her vehicle (e.g., when the user's vehicle is parked at the location), authorize billing for additional services, or the like.

In an example, this architecture may be adapted for communication between service providers, service requestors, and the Edge/Cloud System. In an example, a user application, such as the user/vehicle application 112 may "talk" or communicate directly to the edge/cloud devices such as object detection or filtering edge device 116, location management edge device 118, or cloud 114 such as through an edge/cloud application. This communication effectively makes the service a location/curbside navigation service that can be used to provide a very accurate, real-time, vacant curbside-space navigation for services like unloading, pickup, drop off, or the like. Thus, the system may provide vehicle occupants with navigation services integrated into a real-time map generated by either the location management edge device 118 or the cloud 114. In an example, the system may also periodically broadcast messages with coarse-grained information about the location space such as a determination of statistic utilization rate as a function of time (e.g., at a granularity of every 15 minutes) for different usage purposes (e.g., loading or unloading of passengers, delivery services, or the like), which may provide the user 110 with information about the likelihood of finding available location space for their desired purpose, and allow the user 110 to plan a convenient arrival time. The periodically broadcast messages may be of particular use to an individual or user with limited available bandwidth or low connectivity who may not be able to utilize a real-time map of the location space.

Figure 2:
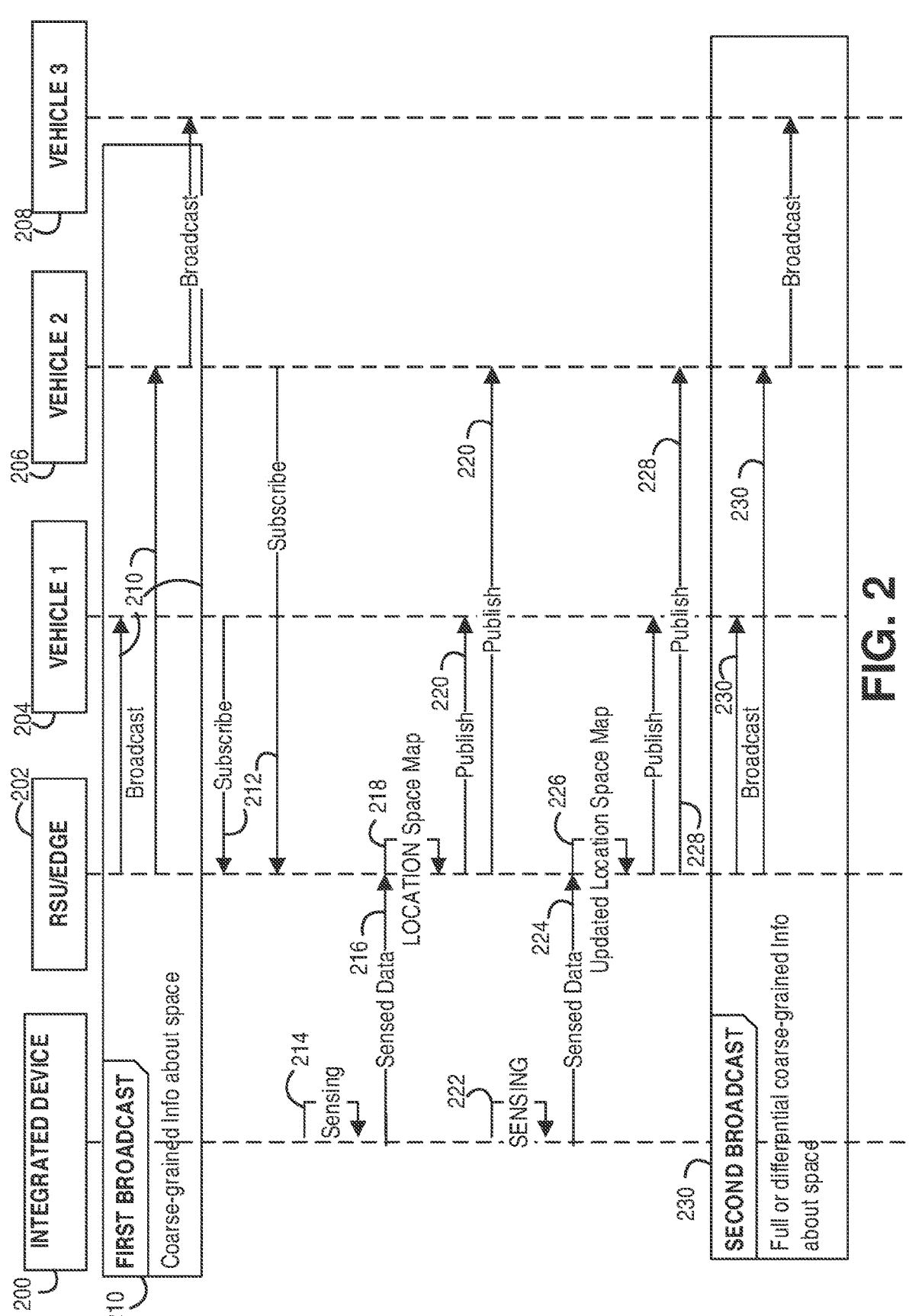
FIG. 2 illustrates an example flow diagram for discovery of location information by a potential service requestor, in accordance with some embodiments.

FIG. 2 illustrates an example flow diagram for discovery of location information by a potential service requestor, in accordance with some embodiments. In the example illustrated in FIG. 2, an integrated device 200 located at the location space, may generate first periodic broadcast 210. The first periodic broadcast 210 may contain coarse-grained information about the location space (e.g., current occupancy, current availability, or the like). In an example, the integrated device 200 may cause the first periodic broadcast 210 to be sent from an RSU/Edge device 202 (e.g., by sending sensed information collected from sensors such as the one or more curbside infrastructure sensors 102, the one or more vehicle sensors 104, or any other sensors located proximate to the curbside to the edge device 202) to a first vehicle 204, a second vehicle 206, and/or a third vehicle 208. The RSU/EDGE device may be a device such as the object detection or filtering edge device 116, the location management edge device 118, or any similar edge device. In an example, any one of the first vehicle 204, the second vehicle 206, or the third vehicle 208 may be dropping off a passenger, waiting to park at the location, picking up a passenger, making a delivery. In an example, the first periodic broadcast 210 may also include a geographic area boundary, which may be a real-time map of the location space.

In response to the first periodic broadcast 210, one or more of the first vehicle 204, the second vehicle 206, or the third vehicle 208 may send a subscribe/acknowledgement response 212. In the example illustrated in FIG. 2, only the first vehicle 204 and the second vehicle 206 send a response to the first periodic broadcast 210 as indicated by the arrows back to the edge device 202. In an example, the response sent by the first vehicle 204 and the second vehicle 206 may contain information such as a region of interest (e.g., a portion of the location space) the vehicle would like to use, a time of interest (e.g., an arrival time at the location space), a duration (how long the vehicle intends to remain at the location), a service desired (e.g., parking, vehicle maintenance, carwash, vehicle charging, or the like), or any other similar information.

In response to receiving the subscribe/acknowledgement response 212 from one or more of the vehicles, the integrated device 200 may perform an updated sensing 214 and send the sensed data 216 from the updated sensing 214 to the edge device 202. Responsive to receiving the sensed data 216 from the updated sensing 214 the edge device 202 may in turn generate an updated location map 218. The edge device 202 may then send a publication message 220 to at least one of the vehicles such as the first vehicle 204 or the second vehicle 206, which may contain the updated location map 218 or any other information or data from the sensed data 216 from the updated sensing 214. The system may optionally perform a second updated sensing 222 collecting second updated sensed data 224 and sending the second updated sensed data 224 to the edge device 202. The edge device 202 may then generate a second updated location map 226 and send a second publication message 228 to one or more of the vehicles. The second publication message 228 may contain the second updated location map 226 or any other information based on the second updated sensed data 224 collected during the second updated sensing 222.

The system may also send a second periodic broadcast 230. In an example, the second periodic broadcast 230 may contain similar or identical information as the first periodic broadcast 210. The second periodic broadcast 230 may also contain updated information based on the second updated sensed data 224 collected during the second updated sensing 222 and/or the sensed data 216 collected during the updated sensing 214. The second periodic broadcast 230 may be broadcast at a pre-determined time interval from the first periodic broadcast 210. For example, the second periodic broadcast 230 may be sent ten minutes, fifteen minutes, or the like, after the first periodic broadcast 210. In an example, the time interval between when the first periodic broadcast 210 and the second periodic broadcast 230 are sent may vary depending on factors such as time of day, day of the week, activity at the location, or the like. For example, during weekends, holidays, overnight, or other times when the location space is less busy or has less activity, the time interval between the periodic broadcasts may be longer. Conversely, if the location space is very busy, such as during a peak time on a weekday, the time interval between the periodic broadcasts may be shorter, for example, five minutes. It is understood that there may be as many periodic broadcasts sent at whatever time intervals are desired or necessary depending on the various factors mentioned above, or any other similar factor(s).

Figure 3:
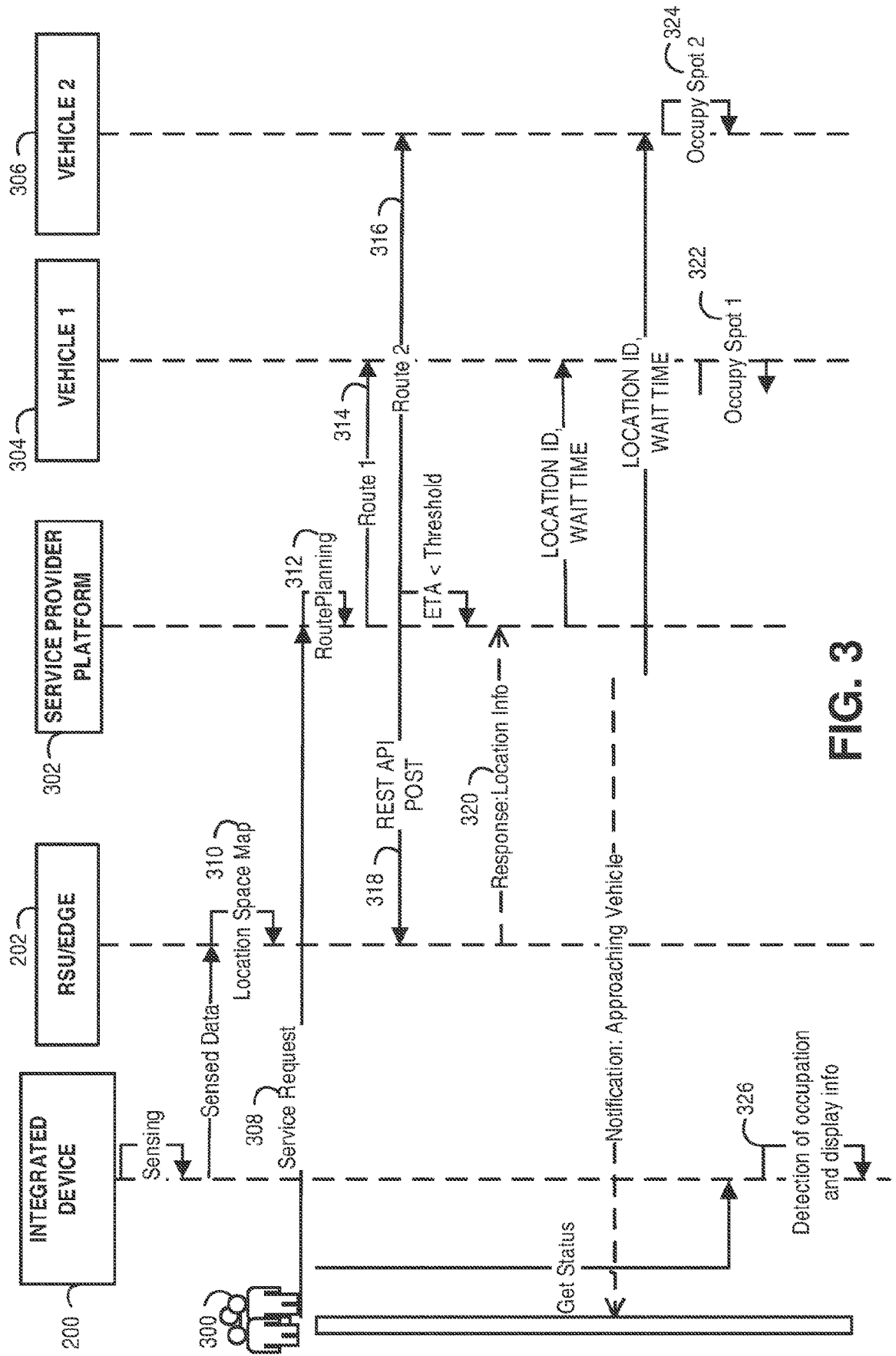
FIG. 3 illustrates an example flow diagram of a dynamic linking of a service provider with a service requestor at a location, in accordance with some embodiments.

FIG. 3 illustrates an example flow diagram of a dynamic linking of a service provider with a service requestor at a location, in accordance with some embodiments. In the example illustrated in FIG. 3, one or more service requestors 300, may send a service request 308 to a service provider platform 302. The service provider platform 302 may be a third-party app or website such as a ride-sharing application, a delivery service application or website, or an application or website of any other similar service provider. Like the process as described in FIG. 2 above, the integrated device 200 may send sensed data collected at a sensing such as the updated sensing 214 or the second updated sensing 222 as described in FIG. 2 above.

Returning now to FIG. 3, the sensed data may be sent to the first vehicle 204 which may, in turn, generate a location space map 310. The service provider platform 302 may generate a route plan 312, which may include a route to a particular portion of the location space, as well as an ETA for a time for the service request 308 to be completed. The service provider platform 302 may transmit a first route 314 to a first service provider vehicle 304 and transmit a second route 316 to a second service provider vehicle 306. It is understood that the system may receive multiple service requests, which may be sent to different service provider platforms (which may be platforms belonging to unassociated service providers), and thus different routes may be sent to as many different service provider vehicles as desired or necessary. For example, the one or more service requestors 300 may be different people waiting for a pickup from a ride-sharing service at a location space near a stadium after a concert or a sporting event. The different service requests may be sent from the one or more service requestors 300 almost or substantially simultaneously. In some cases, the first route 314 and second route 316 may be the same route sent to vehicles associated with the same service provider in order to possibly service the same service request 308. In other cases, the first route 314 and the second route 316 may be different routes sent to different service providers to service different service requests from different service requestors from the one or more service requestors 300.

In an example, when the estimated time of arrival (ETA) for the service request to be completed is less than a threshold value (e.g., five minutes, ten minutes, or any other amount of time) the service provider platform 302 may transmit a REST API post message 318 to the first vehicle edge device 202. The REST API post message 318 may request information about the location space, transmit a region of interest in the location space, or the like. In turn, the edge device 202 may transmit a REST API response message 320, which may contain an identification of the location space that a particular service provider vehicle such as the first service provider vehicle 304 or the second service provider vehicle 306 should travel to, a wait time, or the like.

In response to receiving the REST API response message 320, the first service provider vehicle 304 and/or the second service provider vehicle 306 may travel to and occupy a designated spot. For example, first service provider vehicle 304 may occupy a first spot 322, and second service provider vehicle 306 may occupy a second spot 324. As the vehicles approach their respective spots, the service provider platform 302 may transmit a message to one or more particular service requestors of the one or more service requestors 300 informing the one or more particular service requestor of the approaching vehicle, or that the vehicle is at the designated spot in the location space. The integrated device 200 may generate an occupation notice 326 that can be transmitted to or accessed by the one or more service requestors 300, that may inform the service requestor and/or the service provider that the vehicle has been detected in the designated space, spot, or the like. In an example, the integrated device 200 may send the occupation notice 326 by transmitting a text message to a phone number, sending a message through the user/vehicle application 112, or sending a notification to the service provider platform 302.

In an example, the dynamic sign projector 108 may display digital location signage 106 that displays the status of the particular space/spot. For example, the digital location signage 106 may indicate that the space/spot is a pickup space designated to a particular service provider or may specifically indicate that the first spot 322 is designated for the first service provider vehicle 304 to pick up a particular service requestor of the one or more service requestors 300. In an example, multiple vehicles (particularly autonomous vehicles) from different service providers approaching the location space and competing for a portion of the location space may also form a collaborative group with the assistance of an infrastructure node such as the edge device 202. In such an example, the vehicles within the collaborative group may leverage vehicle-to-everything (V2X) messaging to share their intent to provide their particular service with the members of the collaborative group and agree on a pre-defined order in which they will utilize the location space.

In an example, the service request 308 made by the one or more service requestors 300 may be reservation to utilize a particular portion of the location space for a period of time. For example, an amount of time to make a delivery. In such a case the service requestor may also be a service provider. For example, the service requestor may be a delivery driver seeking to use a portion of the location space for a pre-defined period of time (e.g., ten minutes) to make a delivery. In such a case the digital location signage 106 may display a reserved sign marking a parking spot to prevent other vehicles from occupying the portion of the space. If the service provider does not arrive within the blocked time, the reservation may be released, and the space utilized by a different service requestor and/or service provider.

Figure 4:
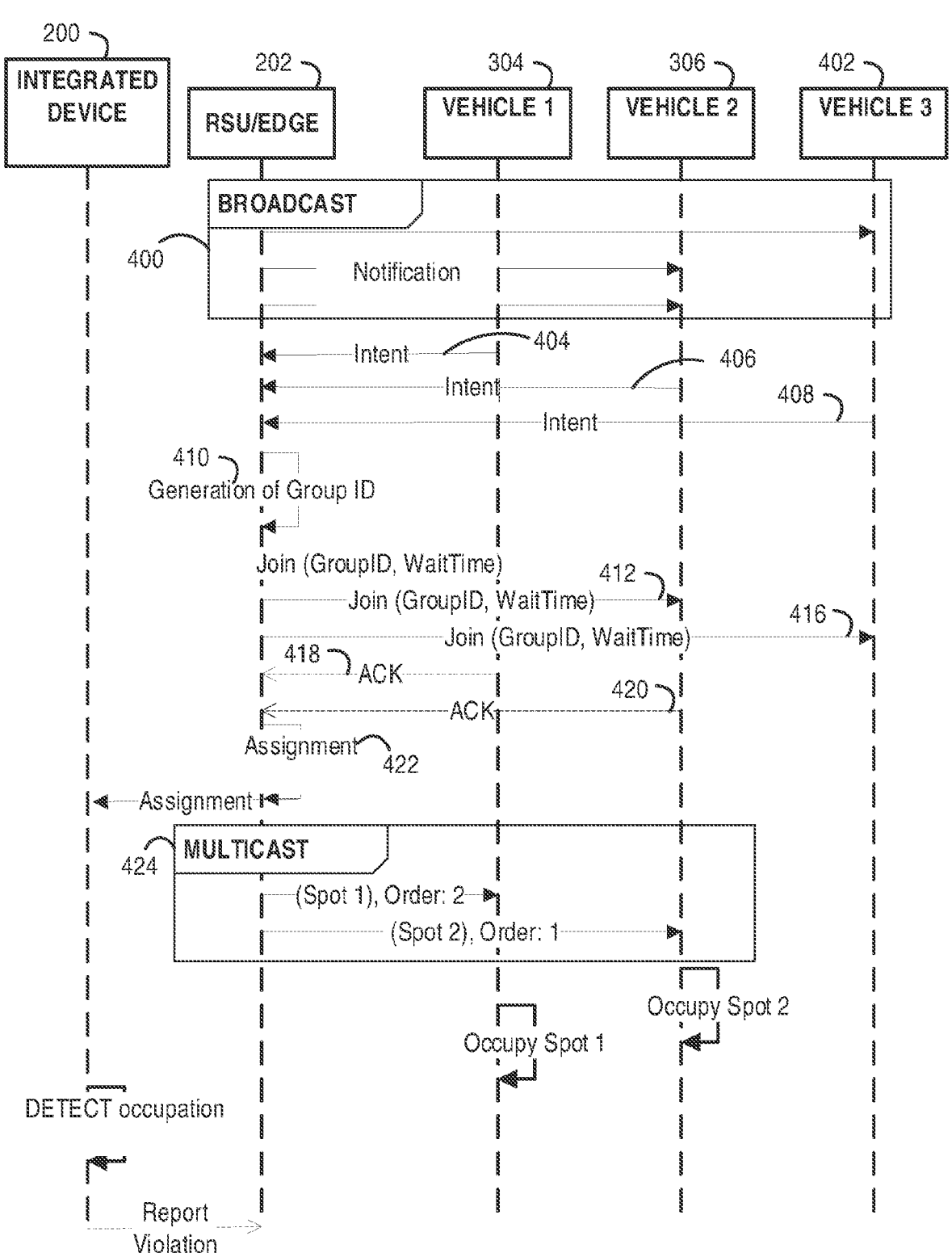
FIG. 4 illustrates a flow diagram for cooperative location space sharing in a dense environment, in accordance with some embodiments.

FIG. 4 illustrates a flow diagram for cooperative location space sharing in a dense environment, in accordance with some embodiments. In the example illustrated in FIG. 4, the edge device 202 may broadcast a notification message 400. In an example, the notification message 400 may contain information such as type of services or uses allowed in at least a portion of the location space, allowed duration (e.g., how long vehicles can remain parked in at least a portion of the location space), or any similar information. The notification message 400 may be broadcast to one or more service provider vehicles such as the first service provider vehicle 304, the second service provider vehicle 306 or a third service provider vehicle 402. In response to the notification message 400, one or more of the service provider vehicles may transmit an intent message to the edge device 202, indicating an intent to use a location space. For example, the first service provider vehicle 304 may transmit a first intent message 404, the second service provider vehicle 306 may transmit a second intent message 406, and the third service provider vehicle 402 may transmit a third intent message 408. The intent messages my contain an indication of a type of service the particular vehicle will provide, an approximate duration to complete the service at the location space, or the like. For example, the first service provider vehicle 304 may transmit the first intent message 404 indicating that the first service provider vehicle 304 intends to drop off a passenger, and that the expected duration is three minutes. In an example, the second service provider vehicle 306 may transmit the second intent message 406 indicating that the second service provider vehicle 306 intends to make a delivery at a nearby business, and the expected duration is ten minutes.

In response to the edge device 202 may generate a group identifier 410 for each of the service provider vehicles and send a join message for each of the vehicles, such as a first join message 412 to first service provider vehicle 304, a second join message 414 to the second service provider vehicle 306, and a third join message 416 to the third service provider vehicle 402. In an example, the join messages may contain information such as the group identifier 410, and an estimated wait time for each vehicle to occupy a portion/spot of the location space.

In response to receiving the join message, any of the vehicles may send an acknowledgement response to the edge device 202. In the example illustrated in FIG. 4, the first service provider vehicle 304 sends a first acknowledgement response 418, and the second service provider vehicle 306 sends a second acknowledgement response 420, while the third service provider vehicle 402 does not send an acknowledgement response message. In an example, based on receiving the first acknowledgement response 418 and the second acknowledgement response 420 from the first service provider vehicle 304 and the second service provider vehicle 306, the 202 may generate an assignment 422, which may assign a portion of the location space to each vehicle. In an example, the edge device 202 may transmit the assignment 422 to the integrated device 200, and transmit a multicast 424, which may broadcast instructions to the first service provider vehicle 304 and the second service provider vehicle 306 indicating a particular spot in the location space each vehicle is to occupy, and in what order each vehicle is to proceed. For example, the multicast 424 may instruct the first service provider vehicle 304 to occupy a spot designated "spot 1" and proceed second (e.g., after the second service provider vehicle 306 has proceeded to its designated spot). Additionally, the multicast 424 may instruct the second service provider vehicle 306 to occupy a spot designated "spot 2" and proceed first. In response to the multicast 424 each of the vehicles may proceed to the designated spots in the designated order.

When a vehicle enters/stops/parks in a spot, the integrated device 200 may detect, using the one or more curbside infrastructure sensors 102, an occupation of the spot, and display the information, such as on the digital location signage 106 near the spot. When the system determines that a vehicle is occupying a spot in violation of the assignment 422, the system may report a violation to the edge device 202, which can, in turn be reported to an appropriate authority such as a service provider, a city authority, or the like. In an example, an entity or a service provider in violation of the assignment 422 may be charged an excess fee (e.g., a surcharge, fine, or the like) or ticketed, for violating the assignment 422.

Figure 5:
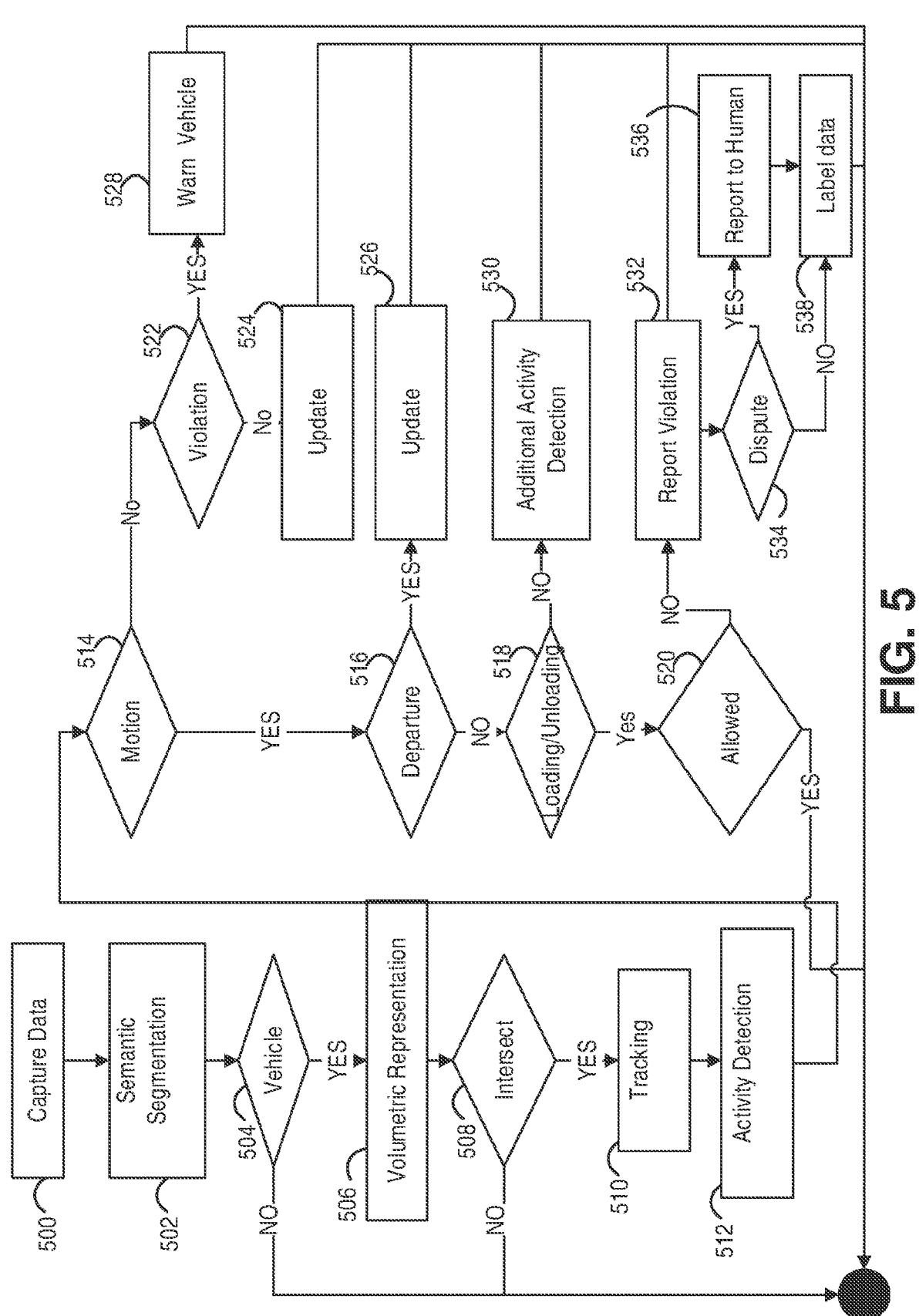
FIG. 5 illustrates an example flow diagram for automated metering and detection of illegal parking or location activities, in accordance with some embodiments.

FIG. 5 illustrates an example flow diagram for automated metering and detection of illegal parking or location activities, in accordance with some embodiments. In an example, at Step 500, the system may capture data from the one or more curbside infrastructure sensors 102 or the crowd-sourced sensors and feed the sensor data into a machine learned/semantic segmentation model at Step 502. At Step 504, the model may determine whether a vehicle is detected. When a vehicle is detected, at Step 506, the system may make a volumetric representation of the vehicle in the space and use the model to determine if the vehicle is intersecting with the location space at Step 508.

When the vehicle is determined to be intersecting with the location space, at Step 510, the machine-learning model may track the vehicle and at Step 512 detect whether there is activity at the vehicle. At Step 514, when the system detects motion at the vehicle, the system can determine, at Step 516, whether the vehicle is departing. When the vehicle is determined to be departing, at Step 526, the system can perform functions such as marking the vehicle as leaving, updating an occupancy map, stopping a charging timer, or any other similar function or combination of functions. When a vehicle is not determined to be departing, at Step 518, the system may determine whether the vehicle is loading or unloading. If no loading or unloading is determined, at Step 530, the system may perform additional activity detection, or offload additional activity detection to a cloud-based server. When loading or unloading is detected, at Step 520, the system may determine whether loading or unloading is allowed. When loading or unloading is not allowed in the particular portion of the location space, at Step 532, the system may report the activity as a violation. In an example, the violation may be reported to a curbside management authority, a service provider, or the like.

At Step 534, the system may determine whether the reported violation is disputed. When no dispute is made, at Step 538, data regarding the violation may be labeled as a correct decision at Step 538. When a reported violation is disputed, at Step 536, the system may report the violation to a human, such as a manager of the curbside management authority, who may review the violation and then at Step 538 label the data with the correct outcome.

When no motion is detected at the location space at Step 514, the system may determine whether the vehicle is parking outside of a designated spot at Step 522. When a vehicle is determined to be parked outside of a designated spot, at Step 528, the system may send a warning to the vehicle (such as through the user/vehicle application 112, through the service provider platform 302, or any other appropriate communication method). When a determination is made that the vehicle is parked in a properly designated spot, at Step 524, the system may update an occupancy map and start a timer to begin charging for the occupancy.

In an example, anonymized hints may be used to improve location management between vehicles and the infrastructure. Collecting information from vehicles or service providers regarding what they are going to do, how they are going to do it, and for how long they are going to do it, or the like, may substantially improve how the location management system works. For example, if a rider has all the information about current and coming pickups or drop-offs to be processed, and information about what services will be performed, the infrastructure may factor all this information, along with other rider contextual information such as type of vehicle, average speed, or the like, to improve how resources are allocated to the different portions of the location space. However, a rider may not want to share his or her information with the infrastructure due to privacy concerns. One potential approach to mitigate these concerns is to have a set of trusted entities that can act as an intermediate trusted entity. At one end, vehicles can use these trusted entities in order to sign the information provided by the vehicles. At the other end, the infrastructure can use certificates from the trusted entities to validate packets of interest that are provided by certain vehicles.

Figure 6:
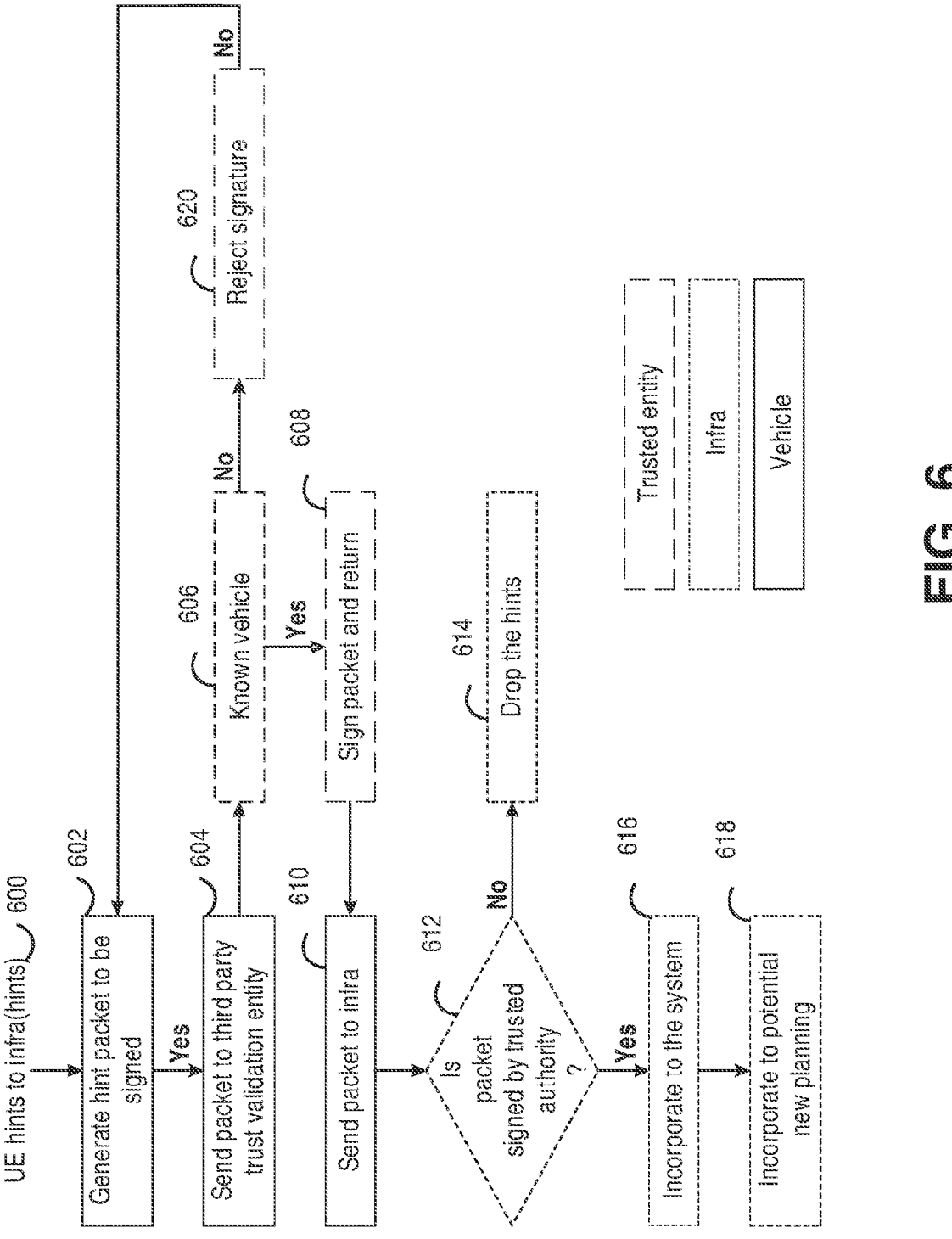
FIG. 6 illustrates an example of a flow diagram for trusted hints among a vehicle, trusted entity, and infrastructure, in accordance with some embodiments.

FIG. 6 illustrates an example of a flow diagram for trusted hints among a vehicle, trusted entity, and infrastructure, in accordance with some embodiments. At Step 600, a user device/user equipment (e.g., a smartphone, a tablet, a computer, or the like) may select and send hints (e.g., via an app installed on the smartphone) to the vehicle infrastructure. At Step 602, the vehicle may generate a packet containing all the hints that it intends to provide to the infrastructure. The hints may indicate arrival time, service to be provided, expected duration, geolocation, or the like. The hints may exclude information about vehicle ownership, what service provider the vehicle is associated with, or the like. At Step 610, the vehicle may send the hint packet to a third-party validation entity. In an example, the vehicle may request that the trusted entity sign the hint packet and provide require credentials and proof of identity. At Step 612, the trusted entity may determine whether the vehicle sending the hint packet is a known vehicle. If the vehicle is unknown to the trusted entity, the trusted entity may reject/drop the signed hint packet at Step 620 and return the hint packet to the vehicle.

At Step 608, when the trusted entity determines that the vehicle is a known vehicle, the trusted entity may sign the hint packet for return. The trusted entity may authenticate the vehicle and perform a validation that the data provided by the vehicle is consistent with previously provided information from the vehicle. In an example, the trusted entity may remove any information that may identify the vehicle or user equipment associated with the vehicle before returning the hint packet. At Step 610, the signed hint packet may be returned to the vehicle, or alternatively, the trusted entity may send the signed hint packet directly to the infrastructure. When the signed hint packet is returned to the vehicle, the vehicle may pass the signed packet to the infrastructure. When the trusted entity sends the signed packet to the infrastructure, the vehicle will have no direct interaction with the infrastructure.

When the infrastructure receives the signed packet at Step 610, the infrastructure, at Step 612, may determine whether the packet is signed by a trusted authority/entity. If not, the infrastructure may reject/drop the hint packet at Step 614. When the infrastructure determines that the hint packet is signed by a trusted entity, at Step 616, the infrastructure may incorporate the hints into the management system, and at Step 618 generate an updated management plan for the location space based on the incorporated hints.

The location management system may be used to implement specific services, such as automated valet parking. In an example, the location space discussed above, utilizing the smart edge technology may be a public or private parking lot, parking area, parking ramp, or the like. The edge infrastructure can be used to implement functions such as automatic discovery of incoming vehicles, on-premises vehicle tracking, vehicle take-over (from a human driver), autonomous driving, automated parking, park time monitoring, and returning the vehicle to the human driver. A backend handling of reservations, payment processing, or the like may also be utilized.

An automated valet parking system enables a human driver to drop off a vehicle at a designated drop-off zone and authorize a parking management system to take over full control of the vehicle and either autonomously drive the vehicle through the parking area and park in an available spot, or in the case of a non-autonomous vehicle, hand control of the vehicle over to a human valet attendant to park the vehicle. Such systems may have widespread applications at large parking areas such as at or near airports, malls, casinos, hotels, resorts, or the like. In an example, multiple parking locations (parking lots, parking garages, parking ramps, or the like) may be utilized as a part of the automated valet parking system.

There are several advantages to an automated valet parking system, especially for autonomous vehicles. First, such a system may provide power saving and efficiency enhancements. For example, if a vehicle is to be parked for an extended period of time, such as in long-term airport parking, the periodicity of keep-alive or heart-beat messages to the vehicle (e.g., to check vehicle status) may be limited or reduced. Similarly, the infrastructure may be able to reduce status checks for the parking location itself (such as checks for parking availability) in long-term parking situations. Also, reliance on cloud-based infrastructure may be reduced in such a system, as the core functionalities for the automated valet parking system are handled by the edge infrastructure where all the computes may be aggregated in a single platform/architecture for a parking location.

Another advantage to the system described herein is the use of aggregated computing, using multiple compute servers stacked together, including clusters of servers located around the parking locations in a single platform/architecture within the parking area. This may also reduce service latency as the edge-infrastructure-based handling of the service offerings and the fact that at least some of the services may be pre-scheduled (before the driver arrives at the parking location) the system may trigger an early search for empty parking spaces and planning to provide any services that may be implemented as soon as the driver arrives at the parking location. Further, using crowd-sourced data from sensors located on vehicles that use the parking location may reduce latency that could occur due to occluded infrastructure sensors native to the parking location itself.

Figure 7:
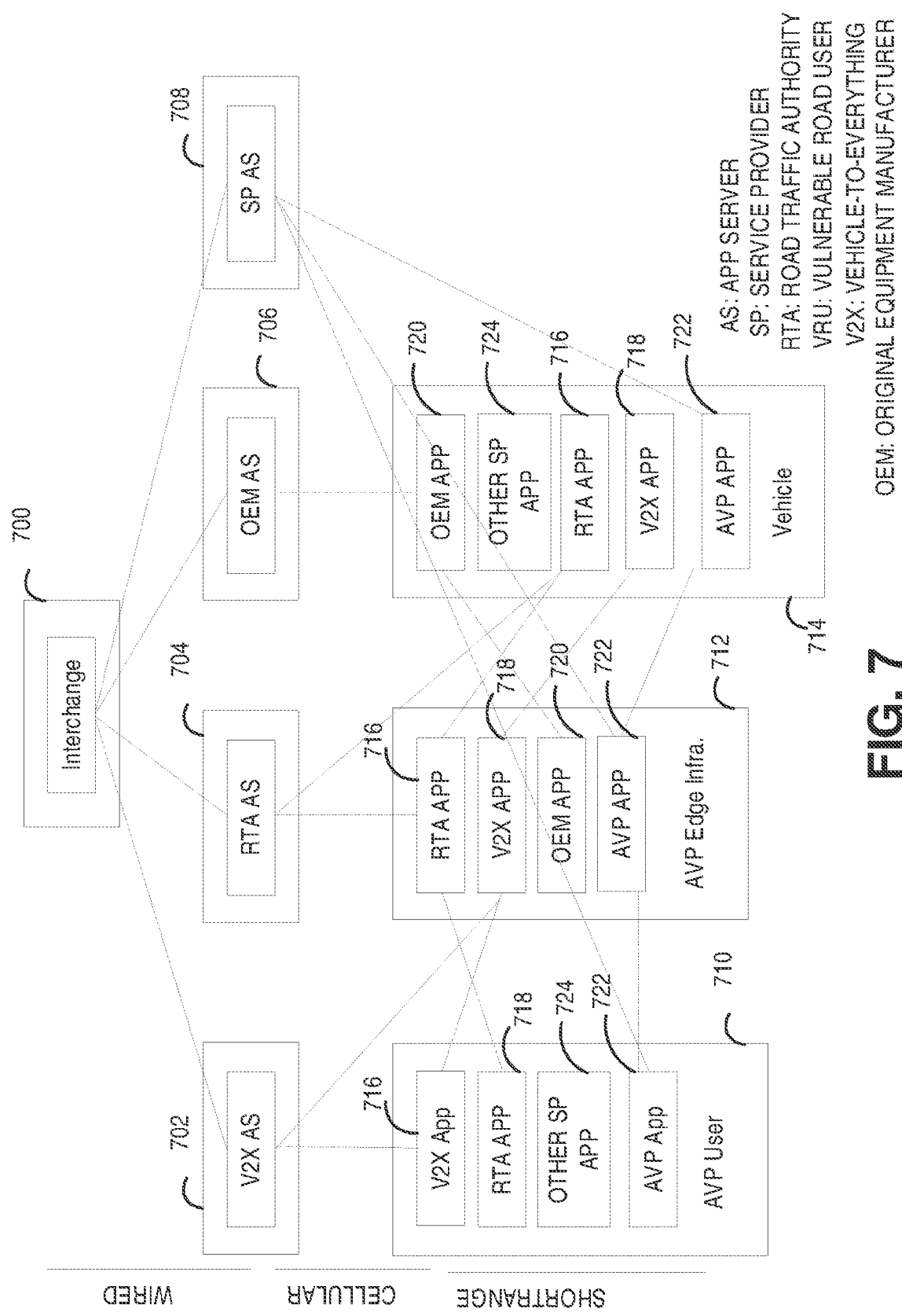
FIG. 7 illustrates example functional components to support edge infrastructure based automated valet parking, in accordance with some embodiments.

FIG. 7 illustrates example functional components to support edge infrastructure based automated valet parking, in accordance with some embodiments. In the example illustrated in FIG. 7, an interchange 700 may be connected, communicatively coupled, or the like, to one or more application servers, such as a vehicle-to-everything (V2X) application server 702, a road-traffic-authority (RTA) application server 704, an original equipment manufacturer (OEM) application server 706, a service-provider (SP) application server 708, or the like.

Each of the various application servers may be communicatively coupled, connected, or the like, to an automated valet parking user device 710, an item of automated valet parking infrastructure 712. The item of automated valet parking infrastructure 712 may be a sensor such as the one or more curbside infrastructure sensors 102 or any other similar sensors, or a vehicle 714. In an example, the automated valet parking infrastructure 712 may include roadside units, as well as non-roadside infrastructure deployed within the parking area, building, garages, or the like, such as dedicated poles located away from the roadside.

In an example, the automated valet parking user device 710, automated valet parking infrastructure 712, or vehicle 714 may be connected to one or more of the V2X application server 702, the RTA application server 704, the OEM application server 706, or the SP application server 708 through applications loaded on the automated valet parking user device 710, the automated valet parking infrastructure 712, or the vehicle 714. For example, the V2X application server 702 may connect to a V2X application 716 loaded on the automated valet parking user device 710, the automated valet parking infrastructure 712 or the vehicle 714. Similarly, the RTA application server 702 may connect to an RTA application 718 loaded on one or more of the automated valet parking user device 710, automated valet parking infrastructure 712, or the vehicle 714. The OEM application server 704 may connect to an OEM application loaded on the automated valet parking infrastructure 712. The SP application server 704 may connect to an SP application or an automated valet parking (AVP) application 722 loaded on the automated valet parking user device 710, automated valet parking infrastructure 712, or vehicle 714. In an example, each of the automated valet parking user device 710, automated valet parking infrastructure 712, or vehicle 714 may have the AVP application 722 installed, loaded, or the like, on them, which may allow each of the automated valet parking user device 710, automated valet parking infrastructure 712, or vehicle 714 to communicate with each other. In an example, the automated valet parking user device 710 or the vehicle 714 may also have additional applications installed, such as applications from other service providers 724, which may be able to communicate with any of the other applications, application servers, or the interchange 700.

In an example, the interchange 700, the various application servers and the automated valet parking user device 710, automated valet parking infrastructure 712, or vehicle 714 may be connected through a combination of wired and wireless connections, such as (PC5), a private network, a cellular network, Wi-Fi, or any similar connection or combination of connections, depending upon the automated valet parking deployment, area of coverage, or the like. For example, in the case of an automated valet parking system covering one indoor parking garage/location, a single private network may be utilized. On the other hand, when an automated valet parking system is utilized in an outdoor public space, it can be based on a side-link (PC5), use a cross-edge system for a wider-area, utilize a cellular network, or any combination of such wireless communication.

Figure 8A:
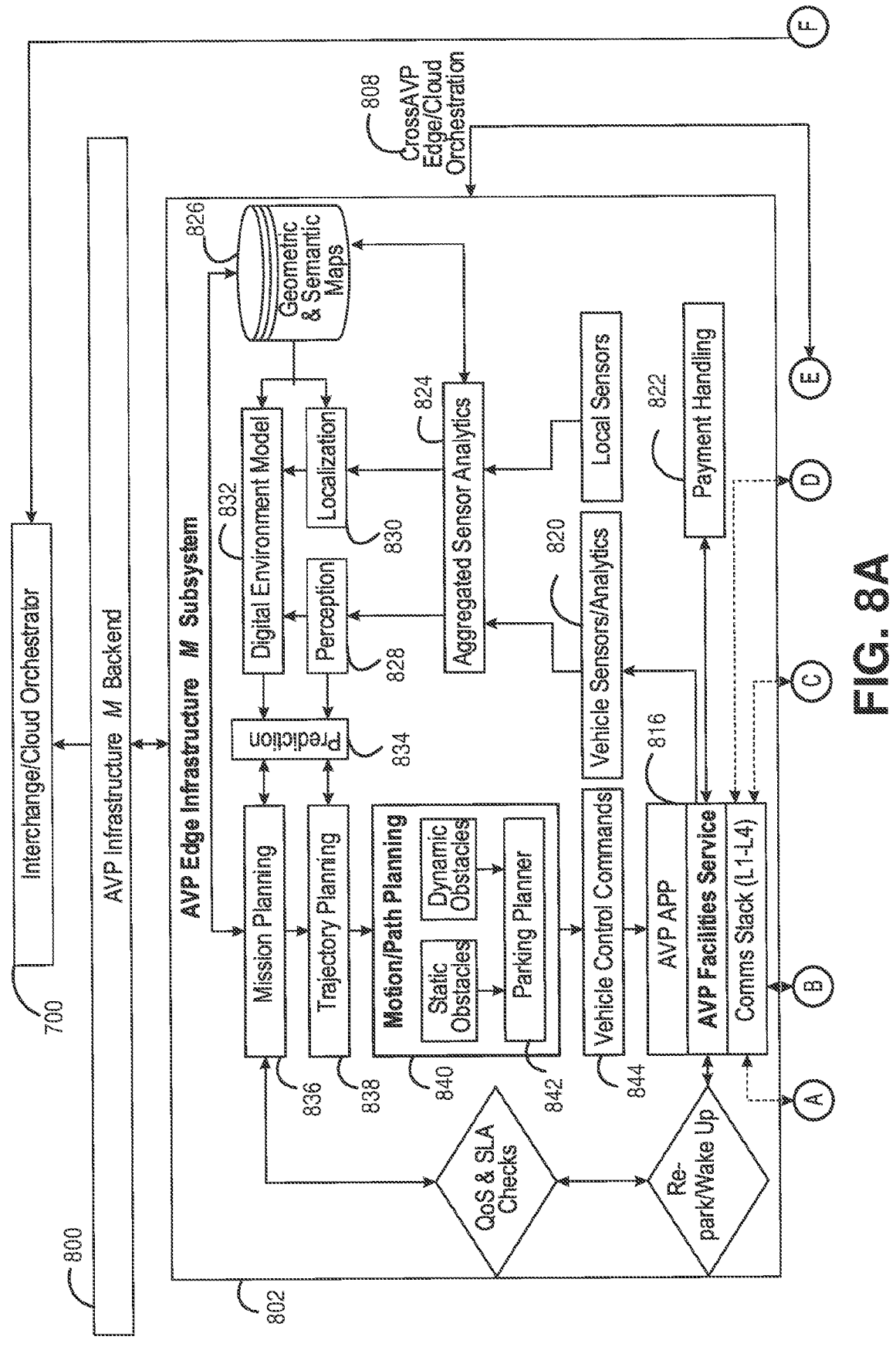
FIGS. 8A-8B illustrate a system architecture of an infrastructure based automated valet parking framework, in accordance with some embodiments.
Figure 8B:
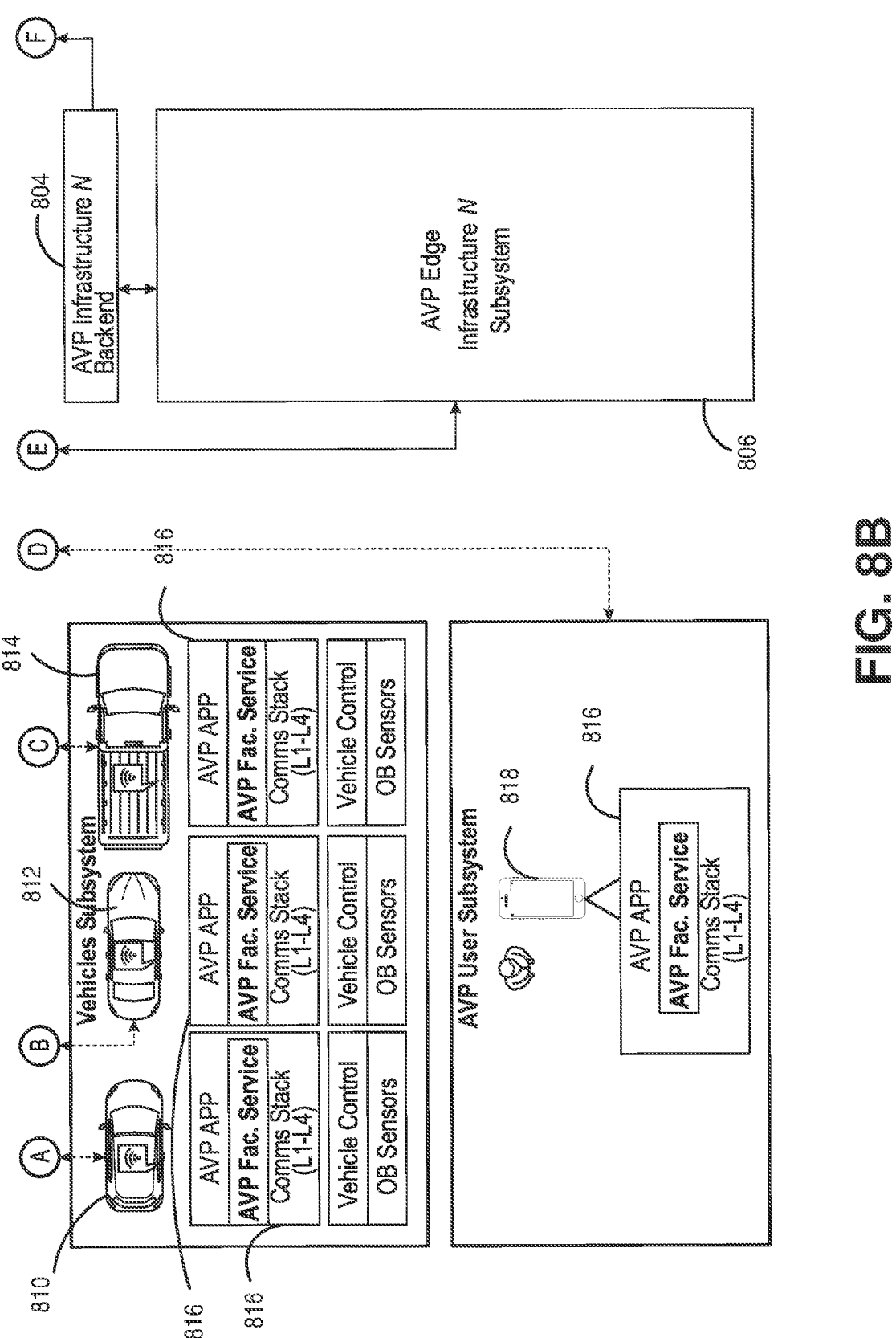

FIGS. 8A-8B illustrate a system architecture of an infrastructure based automated valet parking framework, in accordance with some embodiments. In the example illustrated in FIGS. 8A and 8B, the interchange 700 may be connected to an AVP infrastructure M backend 800, which may in turn be connected to an AVP infrastructure M subsystem 802. The interchange 700 may also be connected to an AVP infrastructure N backend 804, which is in turn connected to an AVP infrastructure N subsystem 806. The AVP infrastructure M subsystem 802 and the AVP infrastructure N subsystem 806, may contain different components depending on the type of infrastructure device the subsystems are contained within. The AVP infrastructure M subsystem 802 and the AVP infrastructure N subsystem 806 may be connected through an interface such as cross AVP edge/cloud orchestration 808, which may be a wired or wireless connection based on connection options available or viable at the location. In an example, the AVP infrastructure M backend 800 and the AVP infrastructure N backend 804, may be cloud backends for collaboration/orchestration of the functions of the AVP infrastructure M subsystem 802 and the AVP infrastructure N subsystem 806.

In an example, the AVP infrastructure M subsystem 802 may contain an AVP APP, AVP Facilities Layer service and Comms Stack Layer—(L1)-Layer 4 (L4) cross stack 816. The cross stack 816 may support a message exchange service for enabling the infrastructure-based automated valet parking. The cross stack 816 may also have corresponding counterparts in the subsystems of a first AVP vehicle 810, a second AVP vehicle 812, or a third AVP vehicle 814, as well as on a subsystem of an AVP user device 818. The cross stack 816 may initiate, facilitate, or the like, a request-response, or push-pull message exchange between all of the subsystems/entities utilized by the AVP system. Further, the cross stack 816 may trigger a user to set any AVP related preferences on, or prior to arrival at the parking location.

In an example, subsequent to various message exchanges between the subsystems, the output of the AVP facilities layer of the cross stack 816 may be transmitted to a vehicle sensors/analytics component 820 and a payment handling component 822, to handle payments local to the AVP system with verification services assisted by a cloud-based server, if needed. The vehicle sensor/analytics component 820 may collect and output perception/analytics information shared by a vehicle interested in using the AVP service, such as the first AVP vehicle 810, the second AVP vehicle 812, or the third AVP vehicle 814. In an example, the output of the vehicle sensors/analytics component 820 may be fed, transmitted, sent, or the like, to an aggregated sensor analytics component 824. In addition to the vehicle sensor analytics from the vehicle sensor/analytics component 820, the aggregated sensor analytics component 824 may obtain sensor data/analytics from the AVP infrastructure, such as the one or more curbside infrastructure sensors 102, or other sensors located at the parking location such as cameras, RADAR, LIDAR, or the like, and all of the sensor data may be aggregated by the aggregated sensor analytics component 824 and sent to a geometric and semantic map database 826, a perception component 828, and a localization component 830.

In an example, data from the aggregated sensor analytics component 824, the geometric and semantic map database 826, the perception component 828, and the localization component 830 may be transmitted to a digital environmental component 832, which may create a digital environmental model (DEM) representation at the edge infrastructure, such as edge device 202. The DEM may be a high-resolution digital twin representation of the physical environment of the parking location and may be sent to a prediction component 834, which may be responsible for a variety of predictive tasks including vehicle mission/trajectory/route/maneuvering prediction for safe remote controlled driving of autonomous vehicles seeking to use the AVP service, prediction of motion of dynamic/moving objects (e.g., people or other vulnerable road users) to aid in collision risk analysis, and avoidance of such entities/objects when a vehicle is being parked by infrastructure-led remote driving.

In an example, the output of the prediction component 834 may be sent, fed, transmitted to, or the like, a mission planning component 836 and a trajectory component 838 in which the infrastructure may search for, and find an empty parking space, and determine one or more set of directions to the empty parking space from a vehicle drop-off location. The trajectory component 838 may set a route from the vehicle drop off location to the empty parking space. In an example, the mission planning component 836 may perform a quality of service and service level agreement check to determine whether a user of the AVP system has selected to have a service performed on the vehicle. For example, the user may select a service such as a car wash, vehicle detailing, an oil change, electric vehicle charging, or the like. In such a case, the mission planning component 836 may determine that the vehicle service may be performed before the car is parked, in which case the trajectory component 838 may plan a route that takes the vehicle to a location where the service will be provided, and then parked in the empty parking space. In an example, the location where the service will be provided may be at the same location as the parking location, or may be remote, off-site, or the like, from the parking location. Further, a user may pre-select a parking duration, a desired parking location, or a desired re-parking preference. Each of these selections may be considered, used, accounted for, or the like, by the mission planning component 836 and trajectory component 838 to determine how the vehicle will be handled or controlled by the AVP system. Information from the mission planning component 836 and trajectory component 838 may be sent to a motion/ path planning component 840 which may include a parking planner 842.

When the mission planning and trajectory determinations are made, the parking planner 842 may send a vehicle control command 844 through the cross stack 816, the vehicle control command 844 including drive maneuvering instructions for navigating/driving of the vehicle (in the case of an autonomous vehicle) to either a parking space or a service location (when the owner has selected one or more vehicle services). In the case of a non-autonomous vehicle, the system may send instructions to a human valet/attendant, instructing the valet/attendant where to park the vehicle, what services to perform on the vehicle, or the like.

In an example, a user of the automated valet parking system can make a reservation to park and/or for vehicle services before arriving at the parking location. Such a feature may reduce latency of the process while at the parking location and enhance the user experience. In an example, a user can input options such as parking interest, parking destination, parking duration, or the like, into the AVP application 722 installed either on a user device such as a smartphone or on the AVP application 722 installed in the vehicle, such as a control panel/navigation display in the vehicle and initiate the automated valet parking process before arriving at the parking location.

Figure 9:
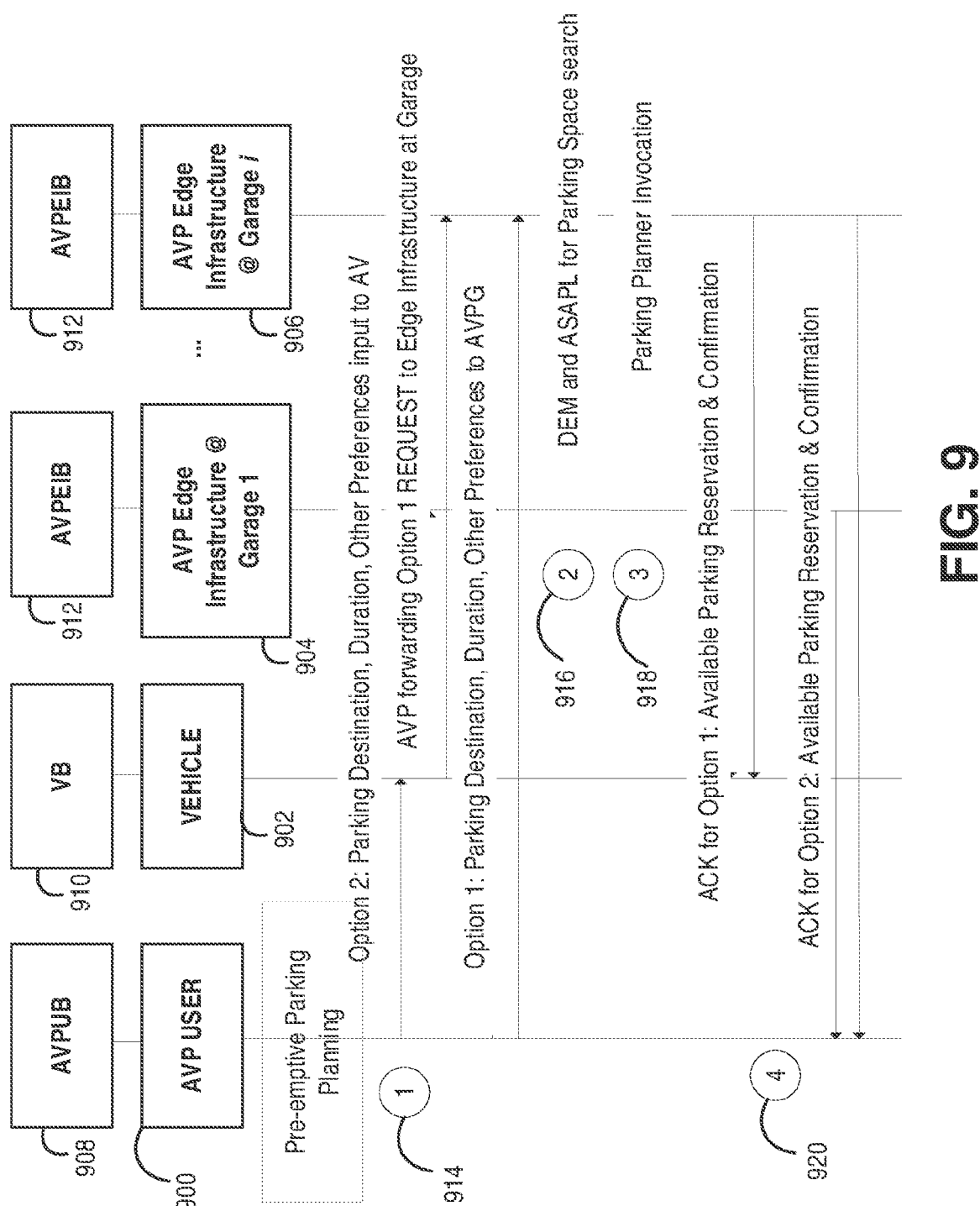
FIG. 9 illustrates a flow diagram for a remote user initiated pre-emptive parking reservation procedure, in accordance with some embodiments.

FIG. 9 illustrates a flow diagram for a remote user initiated pre-emptive parking reservation procedure, in accordance with some embodiments. In the example illustrated in FIG. 9, the AVP system may consist of several entities including an AVP user 900, a vehicle 902, AVP infrastructure at a first garage 904, and AVP infrastructure at a second garage 906. It is understood that "garage" in this context can refer to any parking location such as a parking lot, parking ramp, or the like, and there may be any number of parking locations as a part of the AVP system. It is also understood that AVP user 900 may include a user device/ equipment such as a smartphone, tablet, or the like, on which the AVP application 722 is installed.

Each of the AVP user 900, the vehicle 902, AVP infrastructure at the first garage 904, or AVP infrastructure at the second garage 906 may be connected to a corresponding backend, such as user backend 908, vehicle backend 910, and edge infrastructure backend 912. The various backends may be used to interconnect the respective end devices, sensors on or connected to the end devices, or process data collected from the end devices or sensors.

In an example first phase 914, a user of the AVP system may input a parking interest in a human-machine interface such as the AVP application 722. The AVP application 722 may be installed on a user device such as a smartphone, tablet, computer, or the like, or installed in a vehicle such as on the vehicle's display console. The parking interest may include proximity related inputs such as a parking destination (e.g., what parking location the user seeks to park at), a parking duration, preferences such as a particular floor of the parking location when the parking location is a parking garage or parking ramp with multiple levels, or the like. The user may also select how far from a point of interest (e.g., a mall, a stadium, or the like) the user wishes the vehicle to be parked. In an example, the selections may be sent from the AVP user 900 or the vehicle 902 via the AVP application

722 to automated valet parking infrastructure 712 located at, at least one of, the first garage 904 or the second garage 906.

In an example, the AVP user 900 may select a multi-stop parking option, which may require the request to be routed to multiple AVP garages. For example, a AVP user 900 may select to park initially at one parking location near his or her office but may have plans to meet friends at a restaurant located some distance away from his or her office, and plan to go home after that. The AVP user 900 may request to initially have the vehicle parked at a parking location near his or her office, but then moved to a parking location closer to the restaurant to make retrieval of the vehicle more convenient. Even when the AVP user 900 selects a single-stop parking option, the request may still need to be routed to multiple AVP garages based on a user's preferences to match the best possible AVP garage with available vacancies and parking services that the user has selected.

In an example second phase 916 the digital environmental model created by the digital environmental component 832 and aggregated sensor analytics-based perception and localization data created by the aggregated sensor analytics component 824, perception component 828, and the localization component 830, may be utilized by the edge infrastructure backend 912 when searching for appropriate parking spaces at the available AVP garages. The edge infrastructure backend 912 may determine a "best fit" parking option based on the user's selected preferences, and in a third phase 918 invoke the parking planner 842 to send the vehicle control command 844 through the cross stack 816 to the vehicle or to a human attendant.

In an example fourth phase 920, the edge infrastructure backend 912 may send an acknowledgement response to the AVP user's 900 preferences sent in the first phase 914. The acknowledgement response may be sent to at least one of the AVP user's 900 device or the vehicle 902. The acknowledgement response may include one or more options for parking location at one or more of the first garage 904 or the second garage 906, parking services, parking distance, a reservation confirmation, or the like. The acknowledgement response may request that the AVP user 900 select one of the options, which may complete the reservation process.

Figure 10:
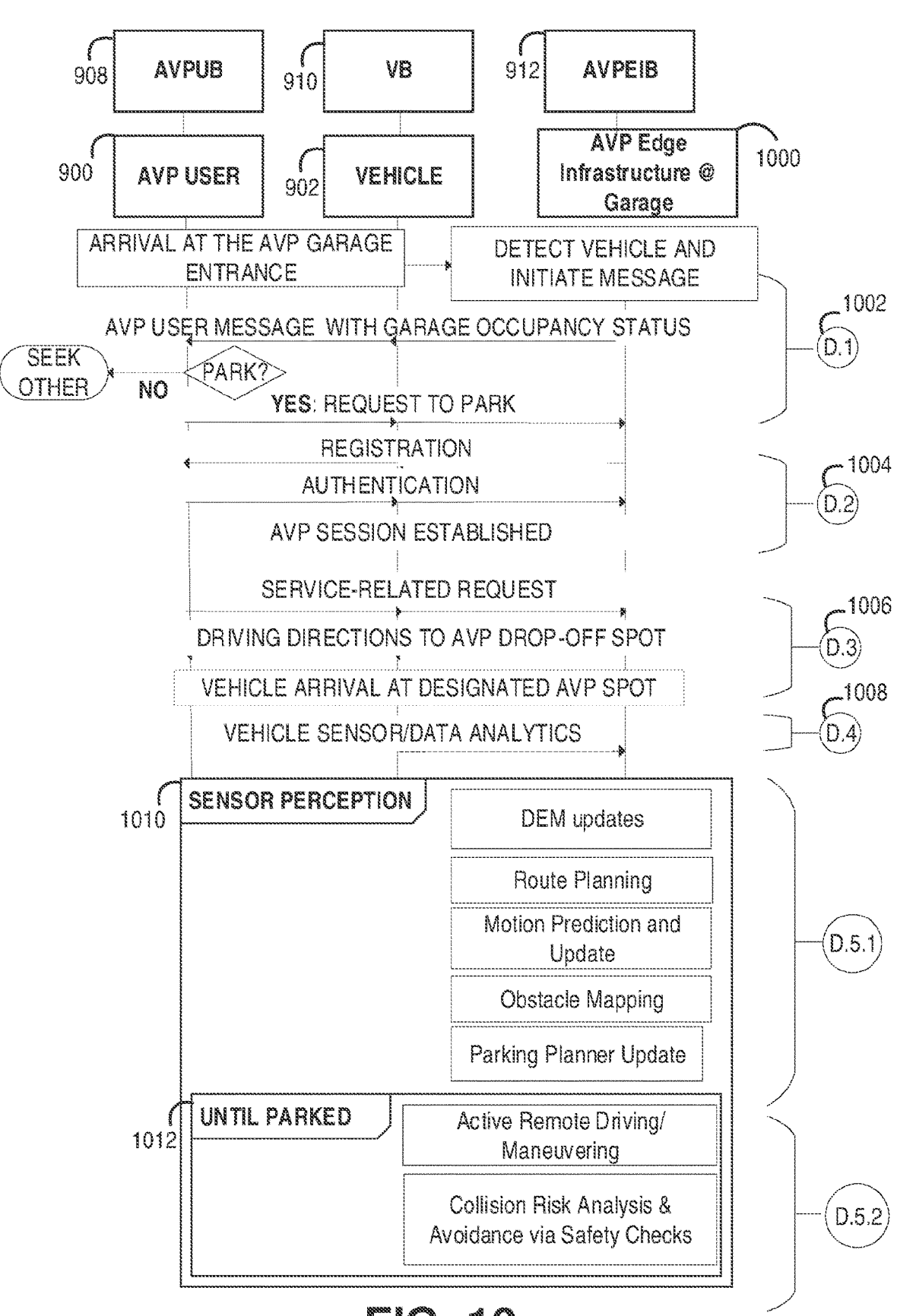
FIG. 10 illustrates an example flow diagram for a parking sequence, in accordance with some embodiments.

FIG. 10 illustrates an example flow diagram for a parking sequence, in accordance with some embodiments. In an example as illustrated in FIG. 10, the AVP user 900 may not utilize the pre-emptive parking registration procedure as described in FIG. 9 but may simply arrive at an AVP garage seeking to use the AVP service. In a first step 1002, labeled D.1, the AVP user 900 and the vehicle 902 may arrive at an AVP garage, and the AVP garage infrastructure 1000 (which may include the AVP infrastructure at the first garage 904 and/or the AVP infrastructure at the second garage 906) may detect the vehicle 902 and initiate a welcome/parking status message to be sent to the AVP user 900, either through the AVP application 722 on the AVP user's 900 device or installed in the vehicle 902. The edge infrastructure backend 912 may also initiate, activate, or the like, the parking planner 842 to check for available parking spaces at the AVP garage. The welcome message may include information such as occupancy status at the AVP garage, a timestamp, and if there are no vacancies/the AVP garage is full, an approximate wait time. In response to the welcome message, the AVP user 900 may transmit a request to park message to the AVP garage infrastructure 1000 indicating that the AVP user 900 is interested in parking or waiting for a space to become available if a wait time is indicated in the welcome message. When there is an indicated wait time, and the AVP user 900 transmits a request to park message, the AVP garage infrastructure 1000 may check to determine whether the wait time $t_w$ is too long. For example, the AVP garage infrastructure 1000 may check to see whether $t_w > \lambda$ where $\lambda$ is a configurable threshold set by the parking planner 842.

In an example second step 1004, labeled D.2, once the AVP user 900 or the vehicle 902 sends the request to park response to the welcome message, a user/vehicle subscription/registration message may be sent to the AVP user 900 from the AVP garage infrastructure 1000. In an example, the subscription/registration message may be a key-exchanged-based registration/authentication and may contain a subscription identifier, directions to a drop-off spot, or the like. The AVP user 900 or the vehicle 902 may send an authentication response to the AVP garage infrastructure 1000, at which point the AVP garage infrastructure 1000 may add the AVP user 900 and/or the vehicle 902 to a subscription list and issue/assign the subscription identifier to the AVP user 900 and/or the vehicle 902.

In an example third step 1006, labeled D.3, once the AVP user 900 and the vehicle 902 are registered, and a session established the AVP application 722 may trigger the AVP facilities layer of the cross stack 816 installed on the vehicle 902 to get the related awareness information (e.g., external features, position, or the like) and the parking request service-related requirements (e.g., duration, parking lot preference, re-parking interest, or the like), selected by the AVP user 900, and send them to the AVP garage infrastructure 1000. The AVP garage infrastructure 1000 may then issue driving directions to a designated drop-off spot/location, such as to a navigation system of the vehicle 902. If the vehicle 902 is not an autonomous vehicle, the AVP user 900 may drive the vehicle 902 to the drop-off location. If the vehicle 902 is an autonomous vehicle, the AVP garage infrastructure 1000 may send a command to the vehicle 902 to proceed to the drop-off location.

In an example fourth step 1008, labeled D.4, upon completion of the elements in the third step 1006, the digital environmental model/map of the AVP garage infrastructure 1000 may be updated to include static geometric and semantic maps to aid the prediction component 834 with motion prediction. An empty parking slot/spot may be detected and the mission planning component 836 may initiate a remote-driving process after running quality of service and service level agreement checks. In an example, static obstacles and dynamic obstacles on the trajectory may be inputs to the parking planner 842 for static and moving obstacle avoidance as the path to the empty parking spot/slot is calculated. In an example, the elements of the third step 1006 and the fourth step 1008 may be initiated at substantially the same time.

In an example, the AVP garage infrastructure 1000 may be capable, autonomously, of perceiving the environment of the parking location via its own sensors (e.g., LIDAR, RADAR, cameras, or the like) using aggregation analytics. Nevertheless, the AVP garage infrastructure 1000 may utilize crowd-sourced data from other sensors such as those located on one or more vehicles located at the parking location when a portion or entirety of the field of view of the AVP garage infrastructure's 1000 sensors is occluded, obscured, blocked, or the like, to better perceive the environment of the parking location. For example, one or more sensors of the AVP garage infrastructure 1000 may be blocked or have limited view in a certain corner or area of the parking location, may be blocked by a pedestrian or a parked vehicle, or may be affected by a loss of power, in which case data from vehicle sensors may be used by one or more of the components described in FIG. 8A or FIG. 8B to generate aggregated sensor analytics for perception and localization decisions. In an example, the AVP garage infrastructure 1000 may request permission from the AVP user 900 to use the sensors on the vehicle 902 as crowd-sourced data and may include an authorization in a service-level agreement.

In an example, a fifth step may include maneuvering related control commands that occur while the vehicle 902 is in motion. The fifth step may be split into two sub-steps that occur substantially simultaneously, a continuous environmental/sensor perception step 1010, labeled D.5.1, and a until parked step 1012, labeled D.5.2. During these steps, continuous analysis of the collision risk and collision avoidance may be made by the AVP garage infrastructure 1000. Continuous safety checks based on a minimum distance between the vehicle 902 and objects in the parking location may be carried out while the vehicle 902 is actively in motion, and the vehicle 902 maneuvered appropriately based on the safety checks. In an example, an emergency maneuver for the vehicle 902 may be an emergency STOP command which may be triggered by the AVP garage infrastructure 1000, the vehicle 902, or both (depending on the capabilities of the vehicle 902) when a decision on need for the vehicle to stop is made on the environment/perception analytics.

In an example, a closed-loop communication may be established and maintained between the AVP garage infrastructure 1000 and the vehicle 902 for continuous tracking, driving/maneuvering, and parking of the vehicle 902, with quality-of-service, service-level agreement, and safety checks being performed continuously. In an example, a vehicle status report may be obtained from the vehicle 902 by the AVP garage infrastructure 1000 during the closed loop communication. In an example, the vehicle status report may be collected by the AVP garage infrastructure 1000 on a periodic basis by reporting from the vehicle 902 and/or via push (by the vehicle 902)/pull (by the AVP garage infrastructure 1000) messaging on an event triggered basis. In an example, the event may be objects detected by the vehicle 902, attempted theft of the vehicle 902, or any contact the vehicle 902 makes with an object.

Vehicles using the AVP service may make use of a re-parking option, allowing a vehicle to be moved, re-located, or the like, from an initial first parking space to a second, different parking space. The re-parking may include re-parking the vehicle within the same garage (e.g., moving the vehicle from a top level exposed to the outdoor elements, to a lower, enclosed/covered level), or between two different garages (from a "farther" garage to one located nearer to the user's actual location).

FIG. 11 illustrates an example flow diagram for a re-parking sequence, in accordance with some embodiments. In an example, the re-parking sequence may contain multiple phases. In an example first phase 1100, labeled E.1, the AVP infrastructure at the first garage 904 may find vehicles with existing/current re-parking interest. This may be determined from the AVP user's 900 selections made in the AVP application 722 during the registration process described in FIG. 10. In an example second phase 1102, labeled E.2, the AVP infrastructure of the first garage 904 may receive new on-demand re-parking interest from the AVP user 900 or the vehicle 902, and may aggregate the existing request from the first phase 1100 with the new requests, and queue them. In an example, the requests may be queued on a first-come, first-served basis. In an example, the requests may be queued based on a service level. For example, if a AVP user 900 has paid for a premium service plan, his or her re-parking request may be moved to the front of the line regardless of whether it was made after a different AVP user 900 who has paid for a basic service plan.

An example third phase 1104, labeled E.3, may be a loop that the AVP infrastructure of the first garage 904 and the AVP infrastructure of the second garage 906 implements. The loop may consist of selecting vehicles with re-parking interest, and probing a nearby garage for occupancy status (When a AVP user 900 has indicated a preference to re-park at a different garage). This may include the AVP infrastructure of the first garage 904 communicating a vacancy probe with the AVP infrastructure of the second garage 906, to determine an occupancy status for the second garage (e.g., if the second garage has available parking spaces, and/or an approximate wait time for an available parking space). AVP infrastructure of the second garage 906 may send a response to the vacancy probe to the AVP infrastructure of the first garage 904. When there is no vacancy at the second garage, the system may continue to iterate through the loop.

When there is a vacancy at the second garage, the system may continue to a fourth phase 1106, labeled E.4. In the fourth phase 1106, the AVP infrastructure of the first garage 904 may send a re-park request to the AVP user 900, notifying the AVP user 900 of a new re-park opportunity. When the AVP user 900 does not approve the re-park request, the system may abort the re-parking and revert to the first phase 1100. When the AVP user 900 approves the re-park request, the system may proceed to a fifth phase 1108, labeled E.5.

In the fifth phase 1108, the approval may be sent from the AVP user 900 and/or the vehicle 902 to the AVP infrastructure of the first garage 904. In the case of an autonomous vehicle, the AVP infrastructure of the first garage 904 may initiate a drive and re-park command to the vehicle 902, instructing the vehicle 902 to proceed to a new parking spot or a new parking location. In the case of a non-autonomous vehicle, the AVP infrastructure of the first garage 904 may send an instruction to a human attendant to re-park the vehicle 902 in the new parking spot or new parking location. When the vehicle 902 is being re-parked at the second garage, upon arrival at the second garage, the AVP infrastructure of the first garage 904 may hand off control of the vehicle 902 to the AVP infrastructure of the second garage 906, and the AVP infrastructure of the second garage 906 may proceed to send a command to the vehicle 902 to park (or instruct an attendant where to park the vehicle 902) and send a notification to the AVP user 900 that the vehicle 902 has been successfully re-parked.

In an example, a AVP user 900 who is paying to use an AVP parking location by the hour, may, at the end of the initially selected parking duration, may desire to extend the time parked, or retrieve his or her vehicle. The retrieval system may be initiated either on demand by the driver of the vehicle or per a schedule, which may be tracked by a metering system included in the AVP edge infrastructure at the parking location(s) at the end of the parking period. The infrastructure may detect the presence of the driver/user in a pick-up area and, in the case of an autonomous vehicle, "wake up" the vehicle and cause it to drive to the pick-up location. Or, alternatively, in the case of a non-autonomous vehicle, instruct a human attendant to get the vehicle and drive it to the pick-up location and deliver the vehicle to the driver/user. The collaboration between the infrastructures for the garages may be aided by cloud-edge orchestration, to provide a seamless AVP service without an increase in parking time or retrieval time for driver.

Furthermore, a vehicle may be parked at a parking location/garage that is located some distance away from where the driver is physically located, which may require collaboration across multiple garages/parking locations to determine a pick-up location most convenient for the driver and get the vehicle to that location.

Figure 12:
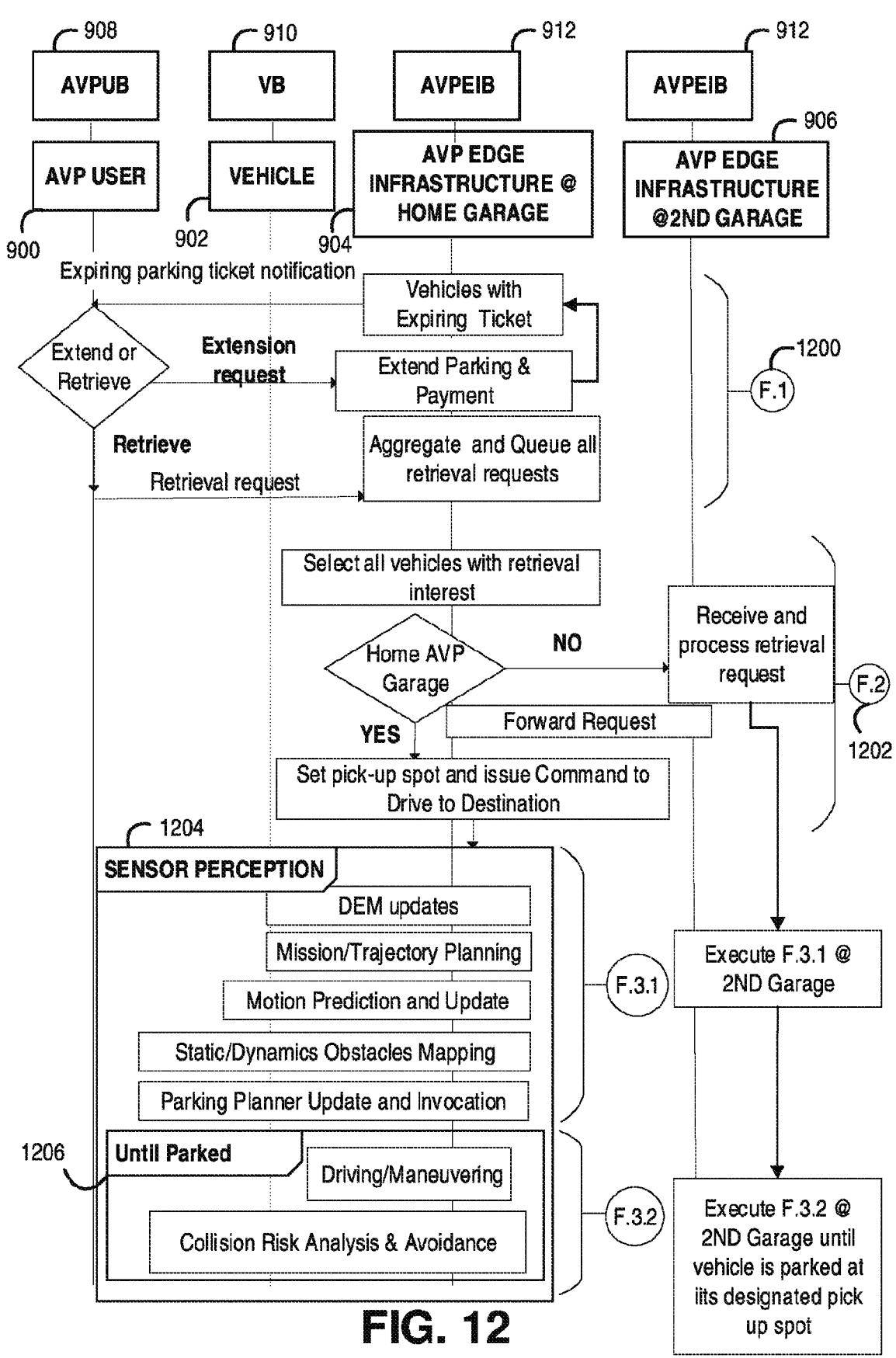
FIG. 12 illustrates a flow diagram for a vehicle parking extension or retrieval sequence, in accordance with some embodiments.

FIG. 12 illustrates a flow diagram for a vehicle parking extension or retrieval sequence, in accordance with some embodiments. In an example, such a process may include multiple phases. In an example of a first phase 1200, labeled F.1, the AVP infrastructure for the first garage 904 or the AVP infrastructure for the second garage 906 may determine which vehicles parked in their location have an expiring parking ticket, and send a notification to the AVP user 900, such as through the AVP application 722. The user may then opt to send an extension request or a retrieval request to the AVP infrastructure for the particular parking location at which his or her vehicle is parked. When the AVP user 900 sends an extension request, a payment or billing may be made to the AVP user's 900 account (e.g., a credit card may be charged, or the AVP user 900 may be subsequently billed for the parking extension). When the AVP user 900 sends a request to retrieve/pick up his or her vehicle, AVP edge infrastructure for the first garage 904 and the AVP edge infrastructure for the second garage 906 may aggregate and queue all the retrieval requests and proceed to a second phase 1202, labeled F.2. In an example, the AVP edge infrastructure for first garage 904 may queue just request for the cars parked at the first garage and the AVP edge infrastructure for the second garage 906 may queue just requests for the cars parked at the second garage. In an example, the retrieval requests for the first and second garage may be queued together, such as by the edge infrastructure backend 912, and processed on a first come, first served bases, or in any other order.

In an example, in the second phase 1202, the system may determine whether the vehicle 902 that is the subject of a particular retrieval request is located at a home AVP garage, which may be the parking location closest in proximity to where the AVP user 900 is physically located. When the vehicle 902 is parked in a home AVP garage, the AVP infrastructure for that particular parking location may set, assign, determine, or the like, a pick-up spot and, in the case of an autonomous vehicle, instruct/command the vehicle 902 to drive to the pickup spot. When the vehicle 902 is not an autonomous vehicle, the AVP infrastructure for the particular parking location may send an instruction to a human attendant to retrieve the vehicle 902 and bring it to the pick-up spot. The AVP infrastructure for the particular parking location may also send a notification to the AVP user 900 with the location of the pick-up spot, a time the vehicle 902 will be ready to be picked up, or the like.

When the vehicle 902 is not parked at a "home garage" (a parking location close to the AVP user 900), the system may forward the retrieval request to the parking location where the vehicle 902 is presently parked. For example, if the first garage is the home garage for the AVP user 900, but the vehicle 902 is currently parked at the second garage, the AVP edge infrastructure for the first garage 904 may forward the retrieval request to the AVP edge infrastructure for the second garage 906, and the AVP edge infrastructure for the second garage 906 may process the retrieval request. In such an example, to process the request the AVP edge infrastructure for the second garage 906 may coordinate, communicate, or the like, with the AVP edge infrastructure for the first garage 904 to set a pick-up spot to be set at the first garage so the AVP user 900 does not have to travel an extended distance to pick up the vehicle 902, and have the vehicle drive from, or be driven from the second garage to the pick-up location at the first garage, or to a location near the first garage where the AVP user 900 can pick up the vehicle 902.

In an example, when the AVP user 900 has pre-selected a pick-up time, such as in the AVP application 722, the AVP edge infrastructure for the second garage 906 may initiate a command to the vehicle 902 to travel to the pick-up location early enough that the vehicle 902 may arrive at the pick-up location at the time the AVP user 900 has scheduled pickup. For example, if the vehicle 902 is parked at the second garage ten minutes away from the pick-up location, the AVP edge infrastructure for the second garage 906 may command the vehicle (or instruct the human attendant) to leave ten minutes before the pickup time so the AVP user 900 does not have to wait at the pick-up spot for an extended period of time for the vehicle 902 to arrive.

Similar to the fifth step described in FIG. 10, when the vehicle 902 is an autonomous vehicle, a third phase of the parking and retrieval sequence may be split into two sub-phases, a continuous environmental/sensor perception phase 1204, labeled F.3.1, and a until parked phase 1206, labeled F.3.2. During these phases, continuous analysis of the collision risk and collision avoidance may be made by the AVP edge infrastructure for the first garage 904 and/or the AVP edge infrastructure for the second garage 906. Continuous safety checks based on a minimum distance between the vehicle 902 and objects in the parking location may be carried out while the vehicle 902 is actively in motion, and the vehicle 902 maneuvered appropriately based on the safety checks. In an example, an emergency maneuver for the vehicle 902 may be an emergency STOP command which may be triggered by the AVP edge infrastructure for the first garage 904 and/or AVP edge infrastructure for the second garage 906, the vehicle 902, or both (depending on the capabilities of the vehicle 902) when a decision on need for the vehicle to stop is made on the environment/perception analytics.

In a typical parking facility (e.g., a parking lot, parking ramp, parking garage, or another parking location) there may be a limited number of Level 3 direct-current fast charging (DCFC) stations, which can be shared by electric vehicles. Additionally, there may be several parking spots in the facility with slower charging units. One or more of the charging stations may support bidirectional power flow that can allow electric vehicles to participate in vehicle-to-grid (F) discharging. Therefore, charging and discharging of electric vehicles may be incorporated into the location management service and/or the automated valet parking service. As such, the edge infrastructure discussed above may be configured to facilitate the management of energy distribution at the location space. The management of the energy distribution may account for dynamic factors such as grid electricity pricing, supply level of on-site-photo-voltaic energy sources, or the like. Further, the autonomous driving capabilities of vehicles may be utilized (when applicable) to automatically manage the usage of charging stations by different electric vehicles. For example, an autonomous vehicle's automatic driving capabilities may be utilized to overcome a limited number of fast charging stations by automatically relocating the vehicles, allowing the vehicles to "take turns" at the fast-charging stations.

Additionally, the system may allow drivers to access an application to buy or sell electric vehicle charge using his or her mobile phone and, in conjunction with the messaging capabilities within the vehicle-to-everything framework, allow users to receive and monitor communications about power related parameters. For example, the system may provide the driver with details such as vehicle charge level, battery capacity, battery health, battery type, charging capabilities or the like, and issue commands to the vehicles such as wakeup commands, autonomous vehicle relocation, or the like. Such a service may turn a parking location into a power-storage hub, which may significantly improve the usage of renewable energy and provide demand response services to the power grid.

Since the system may allow for both charging and discharging of electric vehicles, the system may support vehicle-to-vehicle charging in which a set of electric vehicles connected to a charging station for V2G discharging may provide electric energy to vehicles that are connected to a charging station for charging. Such a feature may be very helpful during emergency situations such as power outages when there is no power available from the power grid, or during peak hours of electricity demand when the prices to charge from the grid are high.

The system may employ/utilize messages that may be exchanged between the parking facility where the smart charging system is installed and a driver or vehicle using the facility. Such messages may include a parking service context/parking request, transmitted by a vehicle or a driver of the vehicle at the entrance of a parking facility, a vehicle profile request message which may be an encrypted unicast message that can be sent by infrastructure located at the facility, such as a road-side unit, after establishing a secure communication mode with the vehicle, to request details from the vehicle. The vehicle may send an encrypted vehicle profile response message to the infrastructure in response to the profile request message. The response message may include information about the vehicle including a vehicle autonomy level (level 0, up to level 5), an energy storage type (electric, gasoline, diesel, hydrogen, liquid propane, or the like), battery fuel capacity, charging capability, or the like.

The system infrastructure may also send a parking navigation request message, which, for an autonomous vehicle, may include a command for the vehicle to drive and navigate within the parking facility to a particular destination, such as a parking spot. The parking navigation request message may include coordinates of the target location/destination, a route/trajectory, or waypoints to follow to reach the target location/destination, or the like. The vehicle may respond with a parking navigation response message, which may be a confirmation that the vehicle has reached the destination, and details such as a timestamp of arrival time, and the coordinates of the destination.

The infrastructure may also send an encrypted unicast vehicle wakeup response message, to activate the vehicle for driving, such as when the vehicle should move from a parking spot to a pick-up location when the driver is ready to depart the parking facility. The vehicle may send an encrypted unicast wakeup response message that may alert the infrastructure that the vehicle is activated for driving.

Figure 13:
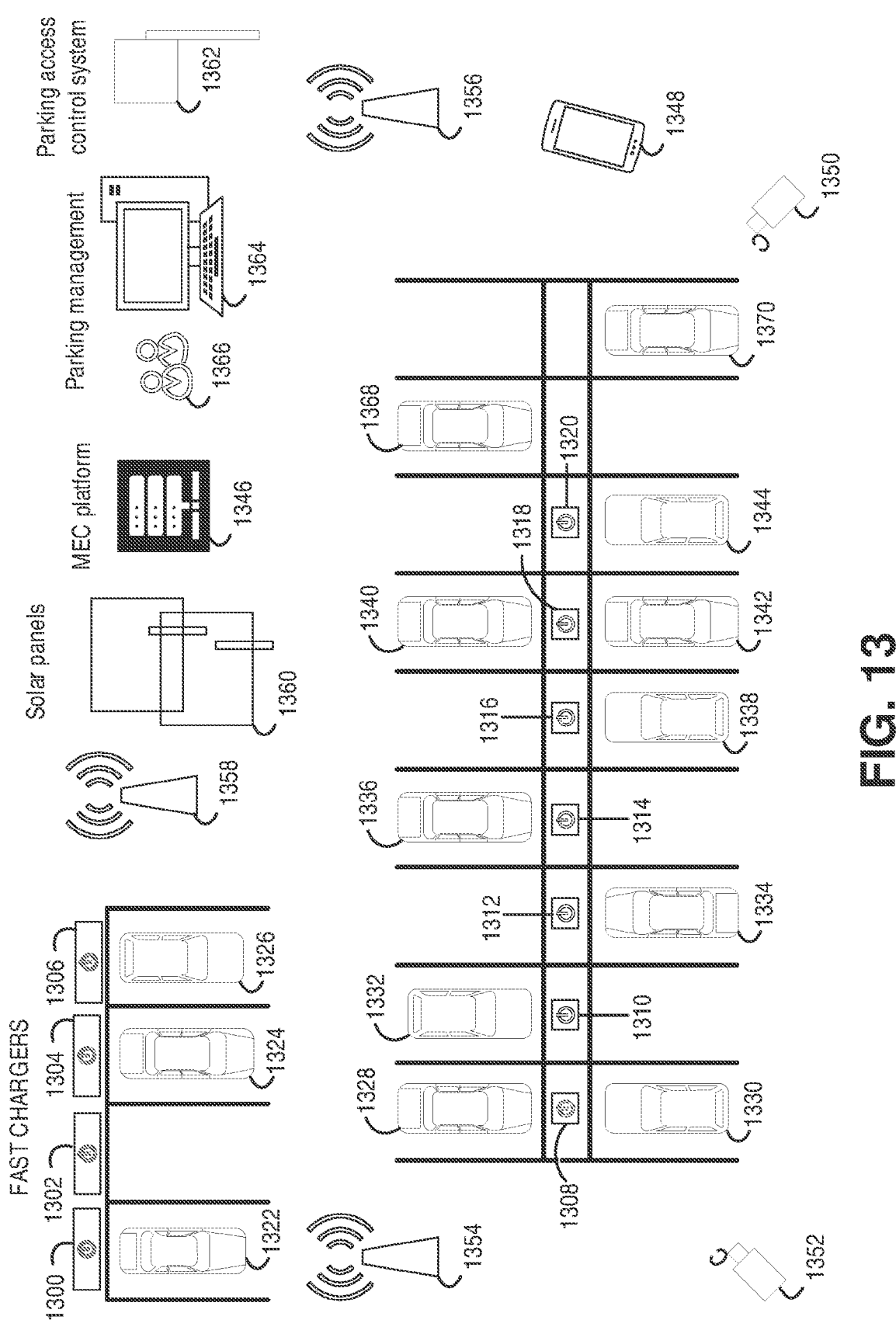
FIG. 13 illustrates an example parking facility with smart electric vehicle charging management and vehicle-to-grid services, in accordance with some embodiments.

FIG. 13 illustrates an example parking facility with smart electric vehicle charging management and vehicle-to-grid services, in accordance with some embodiments. In the example illustrated in FIG. 13, a parking facility (e.g., a parking lot, parking garage, parking ramp, or the like) may contain a number of level two or level three fast charging units/stations 1300, 1302, 1304, and 1306, as well as number of level one slow charging units/stations 1308, 1310, 1312, 1314, 1316, 1318, and 1320 for charging electric vehicles 1322, 1324, 1326, 1328, 1330, 1332, 1334, 1336, 1338, 1340, 1342, and 1344. In an example, the parking facility may contain non-electric vehicles 1368 and 1370 which may be parked in spots that do not contain any charging stations. In an example, one or more of the fast-charging stations 1300-1306 or one or more of the slow-charging stations 1308-1320 may be configured to support automatic plugging of any of the electric vehicles 1322-1344 with autonomous charging capabilities. In an example, one or more of the fast-charging stations 1300-1306 or the slow-charging stations 1308-1320 may allow for the vehicles 1322-1344 to be plugged in manually either by the owner or by a valet/attendant. Further, one or more of the fast-charging stations 1300-1306 or the slow-charging stations 1308-1320 may support bi-directional power flow to allow any of the electric vehicles 1322-1344 to participate in V2G services through which the users/drivers can sell their vehicle's charge back to a power grid connected to the parking facility.

In an example, the parking location may include a multi-access edge computing (MEC) platform 1346 which may host the parking facility's energy management applications and services and manage the charging and V2G discharging operations of the various charging stations. Further, a back-end of the MEC platform 1346 may have connectivity (e.g., via the internet) with one or more cloud-based services to off-load some of the functionality of the energy management applications and services, as well as to a cellular network for communicating with a user device 1348 (e.g., through an application such as the AVP application 722, or a similar application that can be downloaded on the user device 1348), In an example, the parking facility may contain one or more sensors, such as cameras 1350 and 1352, RADAR, LIDAR, or any similar sensors as those previously discussed for monitoring the status of the parking facility. In an example, the MEC platform 1346 may host an environmental perception service which may use the one or more sensors located at the parking facility to collect live information about the parking facility. Further, the environmental perception service may collect crowd-sourced data from other sources as discussed above, including from sensors located on one or more of the vehicles at the parking facility or messages broadcast from one or more of the vehicles (e.g., collective perception messages) to obtain information about the parking facility. In an example, the MEC platform 1346 may process the collected data using perception, sensor fusion, or any other applicable data processing method, to develop a contextual understanding of the parking facility (e.g., current occupancy of the parking spots at the facility, identities and locations of the parked vehicles, or the like). In an example, the MEC platform 1346 may also host digital payment services to execute and manage transactions with vehicle owners and the connected electric grid.

In an example, the parking facility may contain one or more edge compute devices, such as road-side units 1354, 1356, and 1358, to process/aggregate sensor data, as well as manage, facilitate, or the like interactions for both computing resources and physical space sharing at the parking facility. In an example, the road-side units 1354-1358 may work in conjunction with the MEC platform 1346 to perform some, or all of the same computing functions as the MEC platform 1346.

In an example, the parking facility may obtain energy not only from a connected electric grid, but from other on-site sources such as one or more solar panels 1360, or any other similar source capable of collecting or generating electrical energy (e.g., wind turbines, or the like). Using the on-site energy sources, the parking facility may provide demand response services to the electric grid (e.g., supplying power to the electric grid with energy collected by the solar panels 1360, or from one or more of the electric vehicles 1322-1344, through V2G discharging.

The parking facility may also include a parking access control system 1362, which may detect vehicles at the entrance to the parking facility, obtain automatic vehicle identification (e.g., using RFID tags, license plate recognition, or the like), or cause a message to be sent to a driver of a vehicle such as through an application like the AVP application 722 such as the welcome message/parking status message as described above for FIG. 10. In an example, the parking access control system 1362, the MEC platform 1346, one or more of the road-side units 1354-1358 may also send messages, instructions, or the like, to a parking management system 1364. The parking management system 1364 may utilize a combination of human parking management personnel 1366 and a computer-based parking management to facilitate, initiate, or the like, the automated parking management functions. Such as causing instructions to move autonomous vehicles to be sent to the vehicles, determining occupancy at the parking facility, sending instructions to the parking management personnel 1366, or the like. In an example, the parking management personnel 1366 may be located on-site at the parking facility to perform services like plugging in vehicles without autonomous charging capability, moving vehicles without autonomous driving capability, washing, or cleaning vehicles, performing oil changes on non-electric vehicles, or the like.

Figure 14:
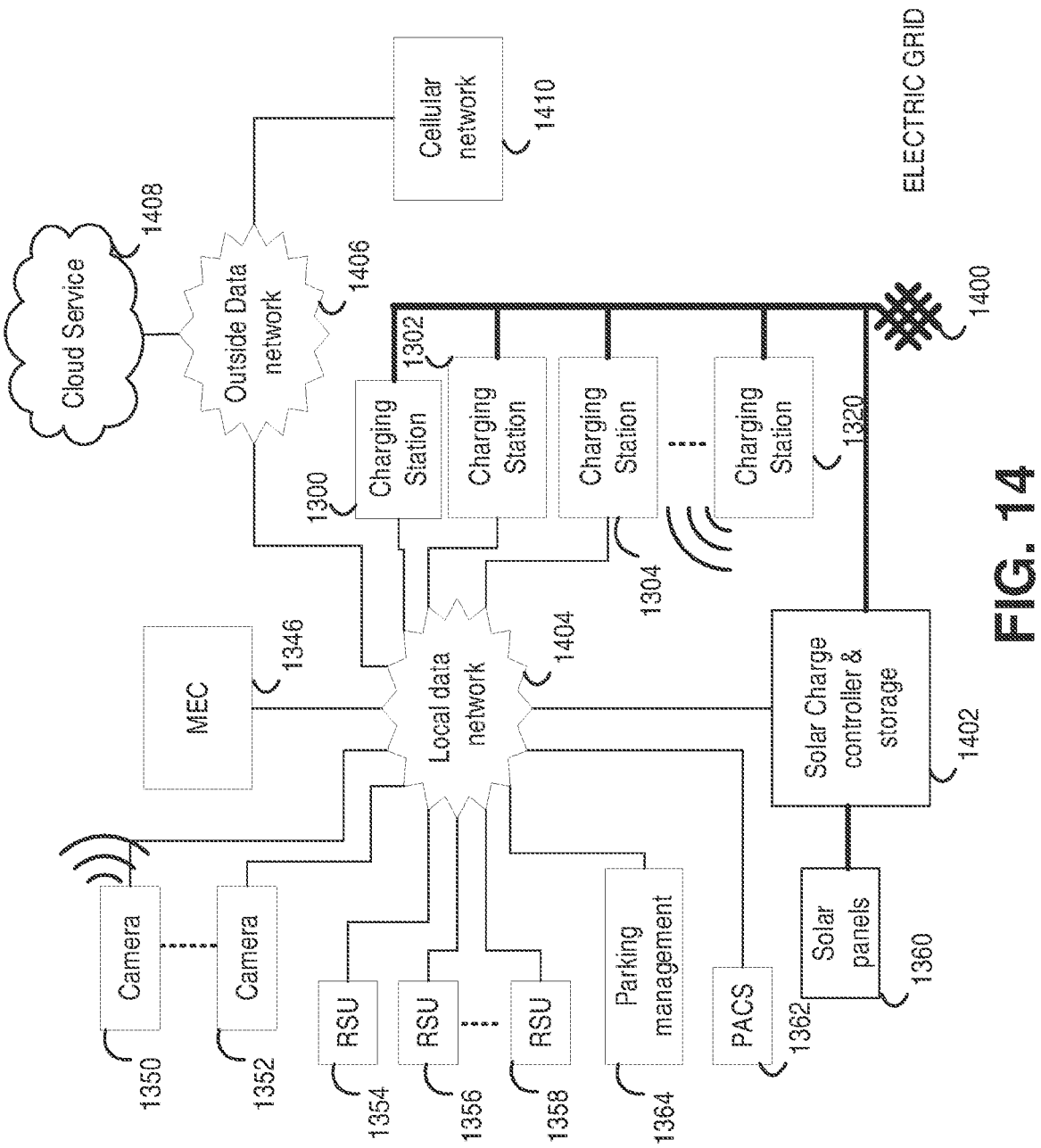
FIG. 14 illustrates an example system architecture for smart electric vehicle charging management, in accordance with some embodiments.

FIG. 14 illustrates an example system architecture for smart electric vehicle charging management, in accordance with some embodiments. FIG. 14 illustrates the connectivity of the infrastructure (both physical and computer based) that may be located at the parking facility. In an example, the electric vehicle stations 1300-1320 may be connected to an electric grid 1400, which in turn may be connected to a solar charge controller and storage device 1402. The solar charge controller and storage device 1402 may also be connected to the solar panels 1360 (or other similar sources of collecting or generating electrical energy), to regulate and store power generated on-site by the solar panels 1360, or other on site-energy collection/generating sources. Thus, the electric vehicles 1322-1344 may be charged using energy from the electric grid 1400 or the solar charge controller and storage device 1402 (e.g., when the electric grid 1400 is unavailable such as during a power outage). Further, energy from the solar charge controller and storage device 1402 may be sold back to the electric grid 1400 when not providing energy to the electric vehicles 1322-1360.

In an example, each of the MEC platform 1346, the cameras 1350-1352, the road-side units 1354-1358, the parking access control system 1362, the parking management system 1364, and the charging stations 1300-1320 may be connected to a local data network 1404, which may be a local-area-network (LAN) local to the parking facility. In an example, the local data network 1404 may be connected to an outside data network 1406, which may be a wide-area-network (WAN), a different LAN, the internet, or the like, connected to a cloud service 1408 and/or a cellular network 1410. In an example, one or more of the infrastructure devices such as the charging stations 1300-3120 or the cameras 1350-1352 may contain a wireless controller to allow for a wireless connection (e.g., Wi-Fi, near-field communication (NFC), Bluetooth® low-energy (BLE), or the like) between the various devices and the local data network 1404, the outside data network 1406, the cloud service 1408, or the cellular network 1410. In an example, the MEC platform 1346 may be deployed within the cellular network 1410 in an integrated manner.

Figure 15:
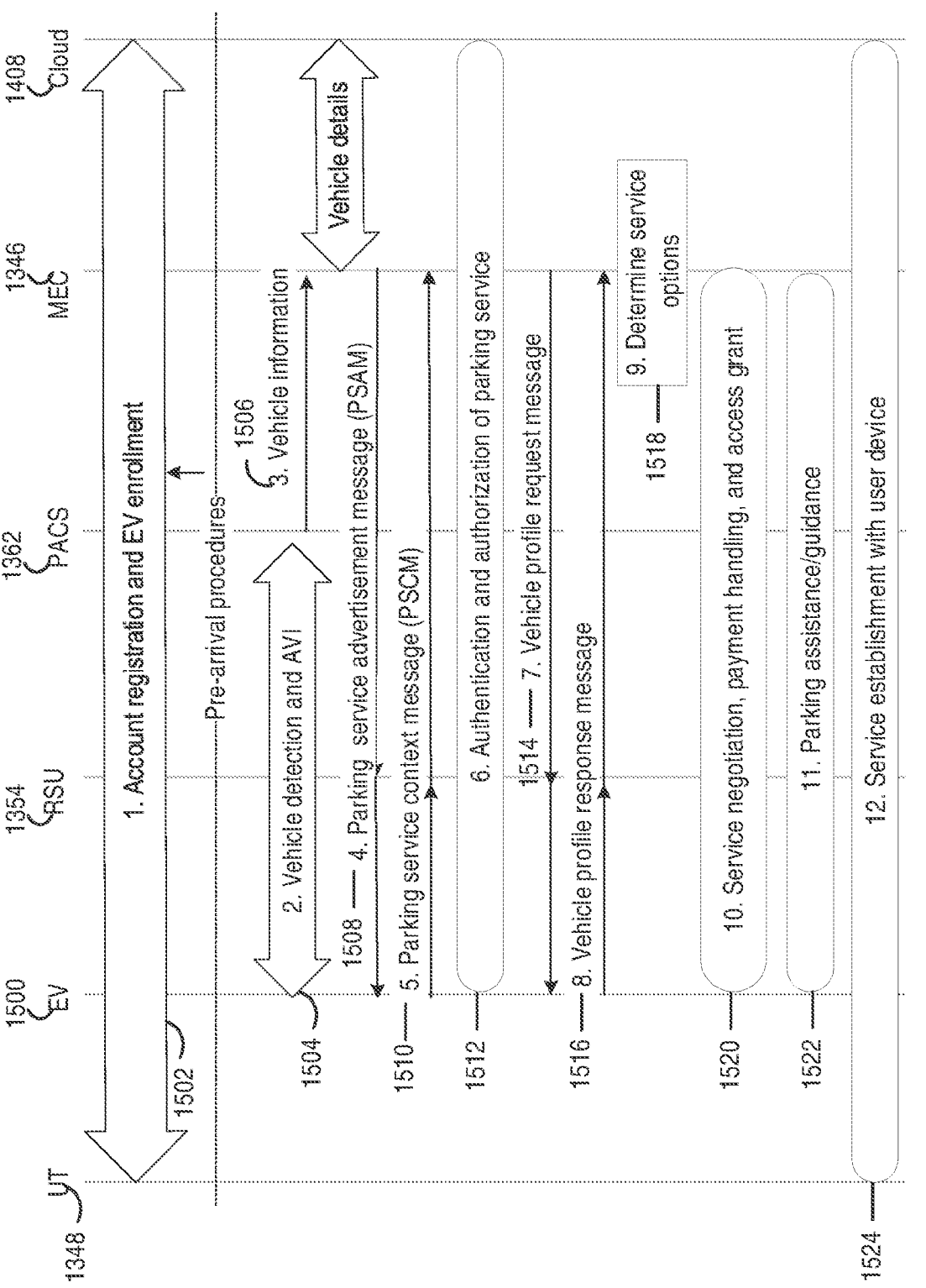
FIG. 15 illustrates an example flow diagram for authentication and pairing procedure during electric vehicle arrival at a parking entrance, in accordance with some embodiments.

FIG. 15 illustrates an example flow diagram for authentication and pairing procedure during electric vehicle arrival at a parking entrance, in accordance with some embodiments. In an example, in a first step 1502, during a pre-arrival process, a driver seeking to use the parking facility may create/register and account and enroll his or her vehicle. This may be done through an application such as AVP application 722 downloaded on the user device 1348, or the vehicle 1500, which may be one of the electric vehicles 1322-1344 or a non-electric vehicle. The registration and vehicle enrollment may be transmitted to one or more of the road-side units 1354, 1356, the parking access control system 1362, the MEC platform 1346, or the cloud service 1408. In an example, the user may register an account for obtaining vehicle charging or V2G services (when the vehicle 1500 is an electric vehicle) at the parking facility. The use of a pre-registered account may provide for more convenient use of the parking facility as the user may have less to do upon arrival at the parking facility and may be able to "drop" the vehicle 1500 and go.

In a second step 1504, when the vehicle 1500 arrives at the parking facility, the parking access control system 1362 may detect the vehicle 1500 and obtain basic information about the vehicle 1500. This information may include make, model, color, license plate number, or the like. The parking access control system 1362 may use automatic vehicle identification (AVI) methods based on radio frequency identification (RFID), license plate recognition (LPR), or the like to obtain as much information about the vehicle 1500 as possible. In an example, a camera such as cameras 1350-1352 may be located at the entrance to the parking facility and may be combined with inference/perception services at the MEC platform 1346 to implement at least a portion of the parking control system's 1362 functions.

In an example third step 1506, the parking access control system 1362 may send the vehicle information to the MEC platform 1346, which may use this information to obtain more details about the vehicle from appropriate cloud services, for example the vehicle identification number (VIN), or the like. For example, the MEC platform 1346 may use the license plate information collected by the parking access control system 1362 to connect to a state vehicle registration site (such as a state department of motor vehicles (DMV) website) to obtain additional information about the vehicle 1500.

In an example fourth step 1508, the MEC platform 1346 may initiate the parking service by broadcasting, transmitting, or the like, a parking service announcement/parking advertisement/parking welcome/parking status message to the user device 1348 or the vehicle 1500. The parking status message may contain information about the parking facility such as occupancy at the parking facility, number of available charging stations 1300-1320 at the parking facility (when the vehicle 1500 is an electric vehicle), wait time for a parking spot, wait time for a charging station, or information about any of the services available at the parking facility. In an example, the MEC platform 1346 may cause the road-side units 1354-1358 to broadcast the parking status message. In an example, the parking status message may be broadcast periodically, or the broadcast may be triggered upon detection of the vehicle 1500 at the entrance to the parking facility. In an example, when the parking status message is broadcast periodically, the period may depend on factors such as time of day, occupancy, day of the week, or the like. For example, on a weekday when the parking facility has open parking spots, the parking status message may be broadcast more frequently (e.g., every five minutes).

Conversely, when the parking facility is full, or on a weekend day, the parking status message may be broadcast less frequently (e.g., every half hour).

In an example fifth step 1510, the vehicle 1500 may inform the driver about the availability/status of the parking facility based on the received parking status message (e.g., through a human-machine-interface (HMI) such as the AVP application 722), and based on the driver's input, the vehicle 1500 may transmit a parking service context/request to park message. In an example, the vehicle 1500 may transmit the request to park message without intervention or input by the driver based on pre-programed or pre-selected decisions of the driver (such as made during the registration process in the first step 1502). The request to park message may also contain information about the vehicle 1500. The MEC platform 1346 may compare the information about the vehicle 1500 sent by the vehicle 1500 in the request to park message with the information about the vehicle 1500 reported by the parking access control system 1362, so as to ensure that the vehicle 1500 at the entrance to the parking facility is the same vehicle that has registered an account. In an example, when the vehicle 1500 does not support V2X connectivity, the driver may interact with the MEC platform 1346, the parking access control system 1362, or the like through a control pedestal, kiosk, or the like, to obtain the parking services.

In an example sixth step 1512, the MEC platform 1346 may initiate authentication and authorizations with the cloud service 1408. During the authentication and authorization process, the MEC platform 1346 and the vehicle 1500 may securely communicate (e.g., using pre-assigned cryptographic keys) with the cloud service 1408 for mutual authentication, and to authorize the MEC platform 1346 to provide parking services to the vehicle 1500.

In an example seventh step 1514, the MEC platform 1346 may optionally send a vehicle profile message to the vehicle 1500 requesting details about the features/capabilities of the vehicle 1500. For example, whether the vehicle 1500 is fully or partially autonomous, is an electric vehicle, or the like. In an example, such information may be collected during the registration discussed above, and when that is the case, the vehicle profile message may not be sent to the vehicle 1500. When the vehicle profile message is transmitted in the seventh step 1514, in an eighth step 1516, the vehicle 1500 may transmit a response to the MEC platform 1346 with details about the features/capabilities of the vehicle 1500.

In an example ninth step 1518, the MEC platform 1346 may determine one or more available service options available to the vehicle 1500 based on the vehicle profile information, the availability status of parking resources (e.g., parking spots, available charging stations, or the like) and service requirements of the vehicle, to offer the driver. For example, if the vehicle is a fully autonomous electric vehicle that requires a fast-charging option, and one of the level three fast charging stations 1300-1304 is open/available, the MEC platform 1346 may provide the option to fast charge the vehicle 1500 to the driver.

In an example tenth step 1520, the MEC platform 1346 and the driver may negotiate for services during which the MEC platform 1346 may offer a default service option (e.g., valet service, charging services, or the like) based on the requirements in the request to park message. The driver may accept the default option or may choose other available service options (e.g., a car wash, car detailing, or the like). Then, the MEC platform 1346 may collect payment information, dispense a parking permit card, or the like, that grants the vehicle 1500 access to the parking facility.

In an eleventh step 1522, when the vehicle 1500 enters the parking facility the MEC platform 1346 may assist/guide the driver to park the vehicle 1500 at a designated parking spot. As discussed above with regard to the AVP system, the parking may be either fully automated when the vehicle has full autonomous driving capability, partially automated (e.g., by sending directions to the parking spot to the navigation system of the vehicle 1500), or through the use of a human valet. When the vehicle 1500 is fully connected an autonomous, the MEC platform 1346 may send a map of the parking facility to the vehicle 1500 (e.g., using a MAP extended message) and/or the details of the charging stations 1300-1320 in the parking facility. The MEC platform 1346 may then send a "parking navigation request" message to the vehicle 1500 that contains navigation instructions to the parking spot. The navigation instructions may include a trajectory/route/waypoint to guide the vehicle 1500 to the destination parking spot. Once the vehicle 1500 has parked in the designated parking spot, the vehicle 1500 may send a "parking navigation response" message to the MEC platform 1346 including a confirmation that the vehicle 1500 has successfully parked.

When the driver selects to use a human valet to park the vehicle 1500 the MEC platform 1346 may instruct the driver to handover the vehicle to the valet, and instruct the parking management personnel 1366, by sending a message to the parking management system 1364, to take possession of the vehicle 1500 and park it in the designated parking spot. In an example, a backend of the MEC platform 1346 may transmit details such as details of the vehicle 1500, the designated parking spot, and any services to be provided to the vehicle 1500 to the parking management system 1364. When the driver opts to park the vehicle 1500 himself or herself, the MEC platform 1346 may send parking instructions to the driver via the HMI of the vehicle 1500 (e.g., the navigation/infotainment display of the vehicle 1500) or display instructions on the access control pedestal/kiosk, or the like.

In an example twelfth step 1524, after the authentication and authorization parking service in the sixth step 1512, the service may be established with the user device 1348. During this process, an application in the user device 1348 such as the AVP application 722 may communicate with the cloud service 1408 to obtain real-time (or substantially real-time) information about the parking service or the parking facility. The cloud service 1408 may link the user device 1348 with parking service session of the MEC platform 1346. During the service establishment process, the user device 1348 and the vehicle 1500 may be authenticated mutually through the cloud service 1408 and the MEC platform 1346 acting as secure bridges between them.

In an example, the MEC platform 1346 may dynamically schedule the vehicle 1500 for charging (when the vehicle 1500 is an electric vehicle). The optimization criteria may include multiple objectives such as maximizing revenue and efficiency while minimizing waiting time to begin charging. Several dynamic parameters and constraints may be considered by the scheduler to maximize the benefits from the available energy sources at the parking facility. For example, the cost of electric power from the electric grid 1400 varies continuously due to factors such as weather conditions, generation source type, demand, or the like. Therefore, opportunistically charging the vehicle 1500 when the price is low and selling the charge back to the grid when the price is high may provide a monetary benefit both to the parking facility and the driver.

Additionally, the power produced by on site resources, like solar energy collected by the solar panels 1360 and stored in the solar charge controller and storage device 1402 may opportunistically be sold to the parked vehicles or to the electric grid 1400 for demand response, thereby contributing renewable energy to the electric grid 1400, which may be a benefit to society. Other factors such as the number of electric vehicles 1322-1344 parked at the facility, supported levels of autonomy, charging capabilities, the driver's charging preferences, or the like, may also affect the optimization by the MEC platform 1346. Finally, historical, and statistical demand for different services (e.g., demand variation at different times during the day), and context information (e.g., special events scheduled near the parking facility), may be utilized by machine-learning algorithms to make informed scheduling decisions.

Figure 16:
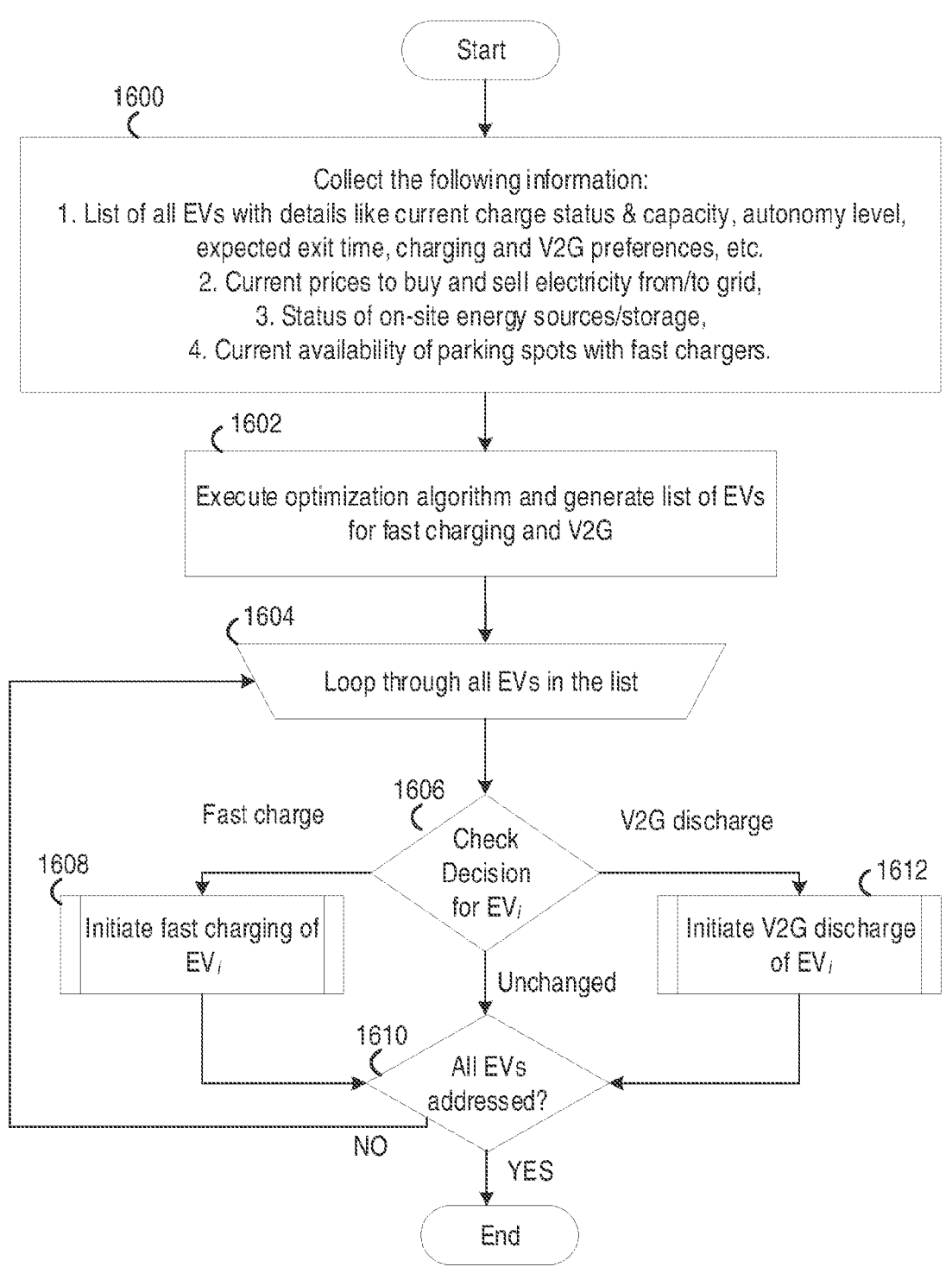
FIG. 16 illustrates an example flowchart of an optimized scheduler for electric vehicle charging and vehicle-to-grid discharging, in accordance with some embodiments.

FIG. 16 illustrates an example flowchart of an optimized scheduler for electric vehicle charging and vehicle-to-grid discharging, in accordance with some embodiments. In a first step 1600, the scheduler may obtain a list of all electric vehicles with details such as current charge status and charge/battery capacity of each vehicle. The scheduler may also obtain the autonomy level, expected exit time, charging and V2G discharging preferences for each vehicle. The system may also obtain current prices to buy electricity from, or sell electricity to, the electric grid 1400. The system may also determine the status of any on-site energy sources such as the solar panels 1360 or an amount of stored energy in the solar charge controller and storage device 1402. The scheduler may also determine the current availability of parking spots with charging stations 1300-1320 and break them down by the number of available fast-charging stations 1300-1304, and the number of available slow charging stations 1306-1320.

In a second step 1602, the scheduler may execute an optimization algorithm and generate a list of all electric vehicles 1322-1344 for fast charging or V2G discharge. In a third step 1604, the scheduler may initiate a feedback loop to determine fast charging or V2G discharging options for each of the electric vehicles 1322-1344. In a fourth step 1606, the system may check a decision for a particular electric vehicle of the electric vehicles 1322-1344. When a fast-charging decision is found for the particular electric vehicle, in a fifth step 1608, the scheduler may cause an initiation of fast charging at one of the fast-charging stations 1300-1304. When a V2G discharge decision is found for the particular electric vehicle, the scheduler may proceed to an alternate fifth step 1612 may cause an initiation of V2G discharging at any of the available charging stations 1300-1320 that support V2G discharging. When a fast charging or V2G discharging decision is not found for the particular electric vehicle, the scheduler may proceed to a sixth step 1610, at which the scheduler determines whether the needs all the electric vehicles in the list generated in the 1602 has been addressed.

When the needs of all vehicles have been addressed, the loop ends. If not, the scheduler loops back to the 1604 and repeats the processed until a fast charging or V2G discharging decision has been made for each vehicle in the list. In an example, the scheduler may perform the steps illustrated in FIG. 16 on a periodic basis (e.g., every half hour) to check to see if the driver has updated fast charging or V2G discharging preferences, or to account for any new vehicles that enter the parking facility.

Figure 17:
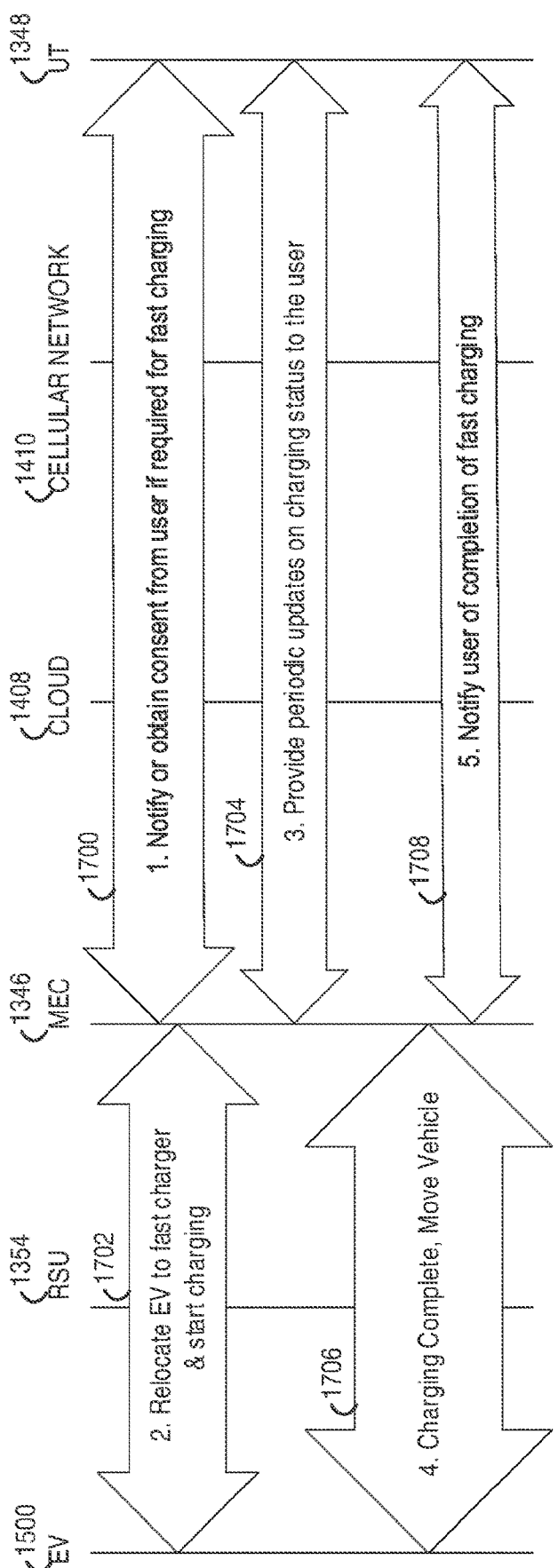
FIG. 17 illustrates an example of a fast-charging procedure, in accordance with some embodiments.

FIG. 17 illustrates an example of a fast-charging procedure, in accordance with some embodiments. In an example, when a vehicle 1500 is scheduled for fast charging, the MEC platform 1346 may initiate fast charging for the vehicle 1500. During this procedure, in a first step 1700, the driver's consent for fast charging may be obtained by the MEC platform 1346 such as from the user device 1348 over the cellular network 1410. Then, in a second step 1702, the MEC platform 1346 may cause the vehicle 1500 to be relocated to one of the fast-charging stations 1300-1304 by any of methods described above and start the charging process. In a third step 1704, the MEC platform 1346 may send notifications to the driver with an update on the charging status. The notification may be sent via the cloud service 1408 such as via e-mail, via a text/SMS message over the cellular network 1410, or to the user device 1348 such as through the AVP application 722 or another similar application installed on the user device 1348.

In a fourth step 1706, once the charging is complete, the MEC platform 1346 may cause the vehicle 1500 to be located at a different parking spot, such as a "regular" parking spot without a charging station. In a fifth step 1708, the MEC platform 1346 may send a notification to the driver informing the driver that the charging process is complete. As with the notification in the third step 1704, this notification may be sent via the cloud service 1408 such as via e-mail, via a text/SMS message over the cellular network 1410, or to the user device 1348 such as through the AVP application 722 or another similar application installed on the user device 1348.

Figure 18:
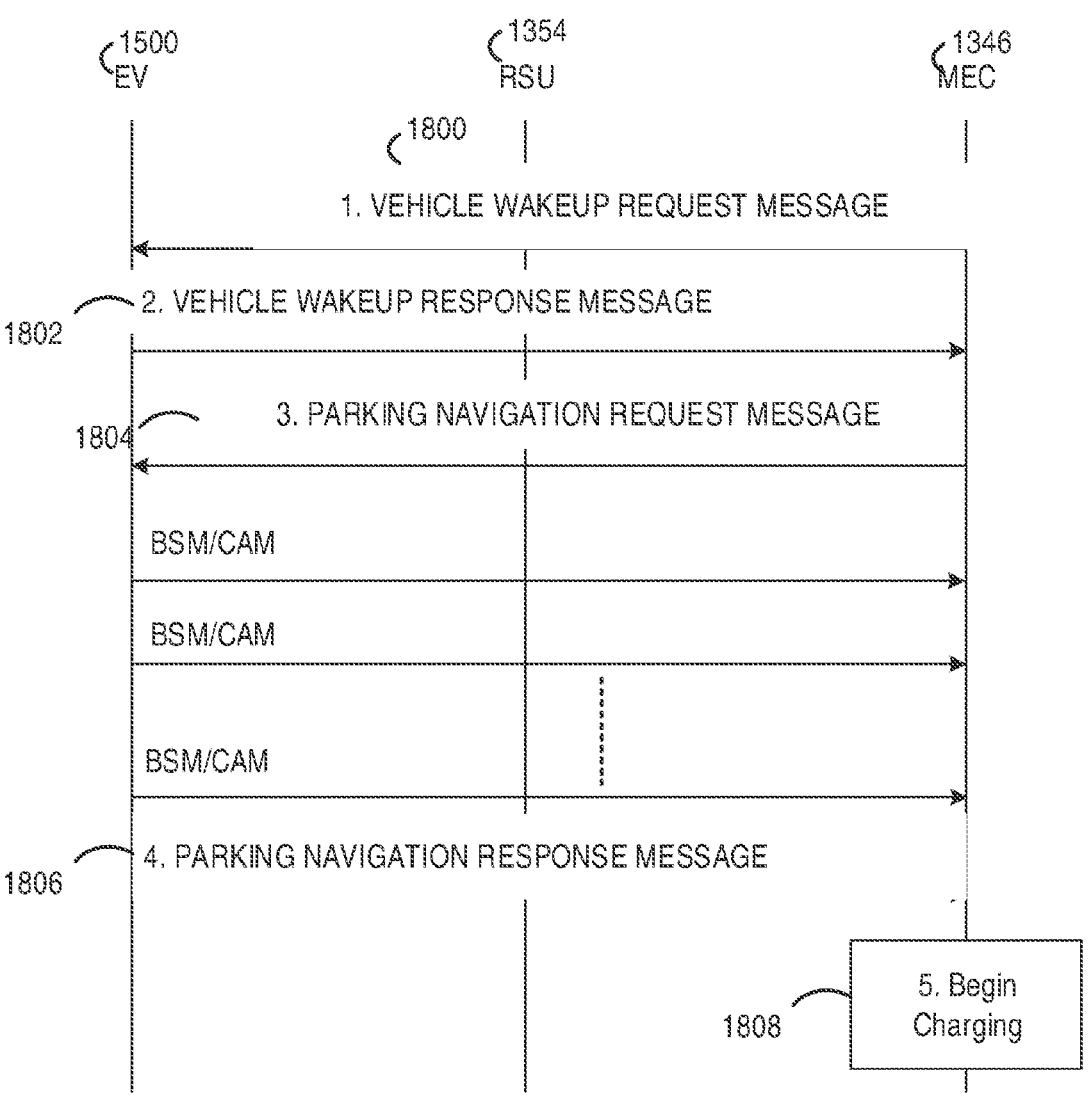
FIG. 18 illustrates an example procedure for relocating an autonomous electric vehicle, in accordance with some embodiments.

FIG. 18 illustrates an example procedure for relocating an autonomous electric vehicle, in accordance with some embodiments. The process of relocating the vehicle 1500 within the parking facility may be substantially the same or similar as those procedures detailed for the automated valet parking discussed above. FIG. 18 illustrates another such example of relocating an autonomous vehicle with V2X messaging capabilities within the parking facility. In an example first step 1800, the MEC platform 1346 may send, communicate, transmit, or the like, a wake-up message to the vehicle 1500. This communication may be aided by, connected through, or the like one of the road-side units, such as 1354 and 1356. The MEC platform 1346 may transmit the wake-up message using an encrypted V2X message that instructs the vehicle 1500 to activate and prepare for driving/navigating to another location, such as one of the charging stations 1300-1320. In an example second step 1802, the vehicle 1500 may transmit a response/acknowledgement to the MEC platform 1346 that the vehicle 1500 has received the wake-up message and has activated.

In an example third step 1804, the MEC platform 1346 may then send a parking navigation request message to the vehicle 1500. The parking navigation request message may contain information such as a target/destination location, and a route, path, trajectory, waypoint, or the like to reach the target/destination location and instruct the vehicle 1500 to proceed to the target/destination location. In response to the parking navigation request message, the vehicle 1500 may proceed to traverse the route/path delivered by the MEC platform 1346 and may periodically transmit one or more basic safety messages (BSMs) or cooperative awareness messages (CAMs) to the MEC platform 1346 to alert the system of its progress to the target/destination location.

In an example fourth step 1806, the vehicle 1500 may transmit a parking navigation response message to the MEC platform 1346 alerting the MEC platform 1346 that the vehicle 1500 has arrived at the target/destination location. When the target/destination location is one of the charging stations 1300-1320, in an example fifth step 1808, the MEC platform 1346 may send a control message to the particular charging station to begin charging the vehicle 1500.

Figure 19:
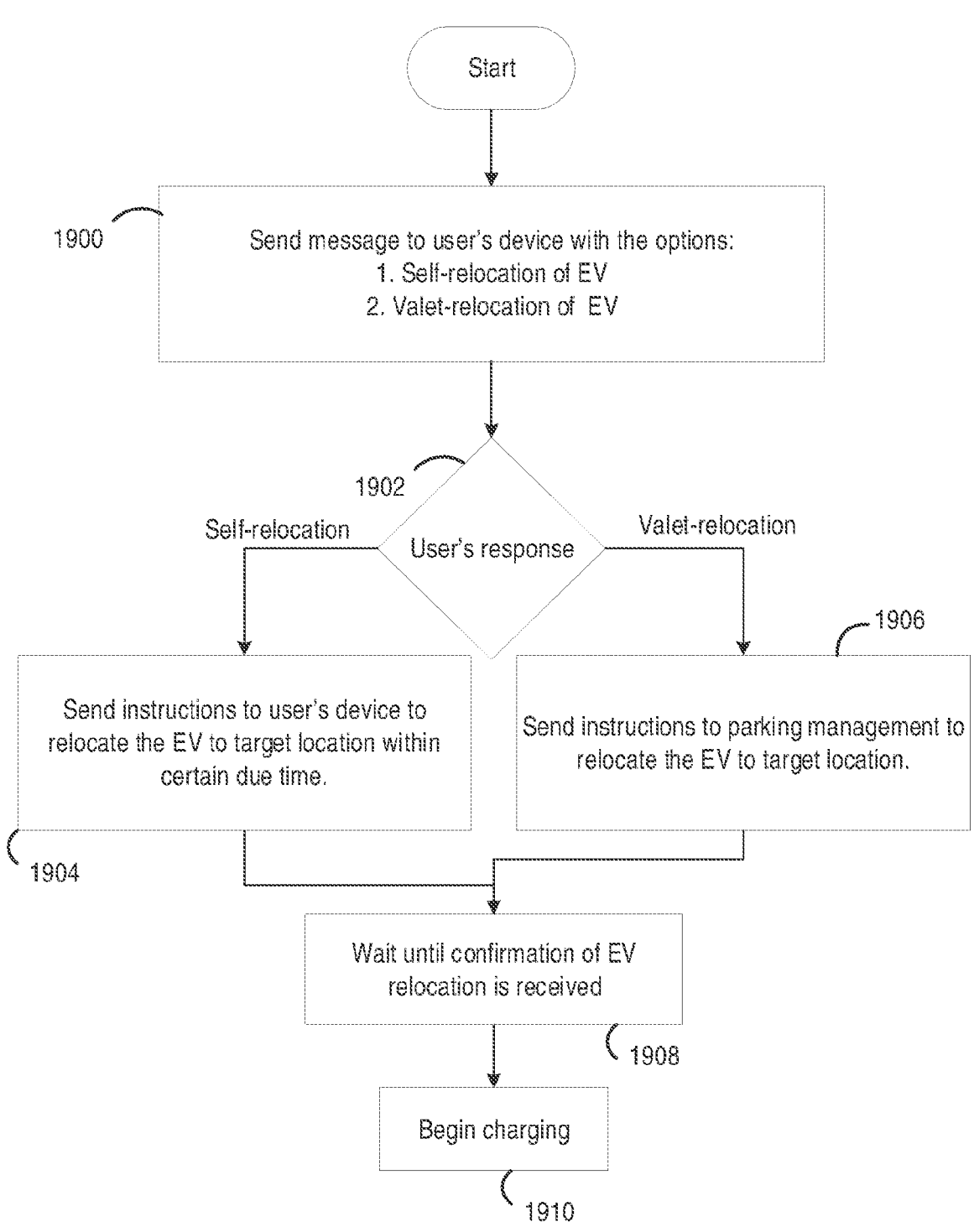
FIG. 19 illustrates an example procedure for relocating a non-autonomous electric vehicle within a parking facility, in accordance with some embodiments.

FIG. 19 illustrates an example procedure for relocating a non-autonomous electric vehicle within a parking facility, in accordance with some embodiments. In an example, a vehicle without autonomous driving capability may use the parking facility and need to be relocated, such as to for charging (when the vehicle is electric) or for car washing, car detailing, maintenance, or the like. In an example first step 1900, the MEC platform 1346 may transmit, send to, or the like, a message to the user device 1348, such as through an application like the AVP application 722 with options to self-relocate the vehicle 1500 or use valet relocation of the vehicle 1500. In an example second step 1902, the user may respond with a self-relocation preference or a valet relocation preference. When the user selects to self-relocate the vehicle 1500 the MEC platform 1346 may, in an example third step 1904, transmit a message to the user device 1348 with instructions for the driver/user to relocate the vehicle 1500 to the target/destination location within a certain amount of time. The message may include instructions on how to navigate to the target/destination location, a parking space number for the target/destination location or the like.

When the driver/user selects valet-relocation, the MEC platform 1346, in an alternate third step 1906, transmit instructions to the parking management personnel 1366 such as through the parking management system 1364 to relocate the vehicle 1500 to the target/destination location. In an example fourth step 1908 when the MEC platform 1346 receives confirmation from the driver/user or the parking management personnel 1366, depending on whether the driver has self-relocated the vehicle 1500 or whether the parking management personnel 1366 has relocated the vehicle 1500. Upon receipt of the confirmation that the vehicle 1500 has been relocated, in an example fifth step 1910, the MEC platform 1346 may transmit an instruction to a particular charging station to begin charging the 1500.

It is understood that the charging services described above may be replaced with any other available or desired services, and that some of the steps in any of the Figures may be repeated, altered, changed, skipped, or omitted entirely depending on what service the vehicle 1500 is to receive, or for what purpose the vehicle 1500 is being relocated, moved, or the like. Further, it is understood that any of the messages, notifications, instructions or the like, may be transmitted between the MEC platform 1346 and any of the road-side units located at the location space, parking locations, parking facilities, or the like, before being transmitted to the vehicle 1500, the user device 1348, the parking access control system 1362, the parking management system 1364, or any of the sensors such as the one or more curbside infrastructure sensors 102, the one or more vehicle sensors 104, or the like. Additionally or alternatively, any of the messages, instructions or any of the functions carried out by the systems described herein may be at least partially implemented on cloud-based servers, cellular networks, or the like as desired or necessary based on factors such as network connectivity, network bandwidth, or the like.

FIG. 20 illustrates an example of a diagram of a method for location management, in accordance with some embodiments. In the example method, Operation 2000 may include obtaining data originating from one or more sensors proximate to the location. In an example, the location may be a curbside space, a parking location, such as a parking lot, a parking garage, a parking ramp, or the like. In an example, the location may be privately owned, publicly owned, or a mix of private and public owned land, property, area, facility, or the like. In an example, the sensors may be one or more sensors connected to infrastructure located at the location, such as light poles, city bus shelters, benches, part of a structure, or the like. In an example, the sensors may include one or more cameras, one or more microphones, RADAR sensors, LIDAR sensors, or the like.

Operation 2002 may include identifying, using a trained activity-based detection model, an activity at the location. In an example, the detection model may be a fully or partially trained machine-learning or artificial intelligence model configured to determine a type of activity based on data collected from the one or more sensors proximate to the location. In an example, the model may use data from a camera along with data collected from a microphone to determine that a person standing at a curbside location is waiting for a taxi, a ridesharing service, or the like. Or, that the person is waiting for a delivery from a messenger service, is waiting for his or her parked vehicle to be dropped off, or the like.

Operation 2004 may include determining a service to be offered at the location made based on the identified activity. In an example, when a determination is made that the person at the curbside is waiting for a ride, for example, if the person is standing in a ridesharing pickup location, the trained model may determine that a ridesharing service should be contacted. In an example, if the person is standing in a taxi pickup location, the model may determine that a taxi should be dispatched to that location. In another example, if a person is waiting at a valet parking pickup zone, the model may determine that the person needs his or her car brought to the pickup location.

Operation 2006 may include sending a message to the user offering the service at the location. In an example, the message may be sent as a notification through an app downloaded and installed on a user device such as a smart-phone or a tablet. In an example, the notification may be made via text message sent over a cellular communication line. In an example, the notification may be via a phone call to the person's phone or sent via electronic mail. In an example, the notification may be made/sent to the user via multiple communication channels such as those mentioned herein, or by any other appropriate mode of communication.

Operation 2008 may include receiving an authorization from the user accepting the service offered in the notification from Operation 2006. In an example, the user may accept the notification in the app installed on his or her phone, by responding via text message, replying to an email, or the like. Operation 2010 may include causing the service to be implemented at the location. In an example, when the user accepts the service in Operation 2008, the system may classify the service as a service type. For example, the system may offer to connect the user to a ridesharing service and set up a ride for the user. The system may send a notification to the user offering to set up a ride from the location with a ride sharing service.

In an example, the system may ask the user if he or she wants a ride to a specific destination, such as the user's home, which the user may save as a destination in the app, or when registering with the location management system. In an example, the system may instruct the user to enter the address of a destination. The system may then match the service type to a service provider. For example, the system may determine that the user wants to set up a ride from the location to his or her home and may match the need for a ride (the service) to an available ridesharing or taxi service (the provider). Once the service type and the service provider are matched, the system may send, as a part of Operation 2010, a notification to the identified service provider with details of the service to be provided. For example, the system may send a notification to the service provider with the user's identity and where at the location the user is to be picked up. In an example, an identifier may be assigned to the user, which may identify the user, the type (make, model, or the like) of vehicle that is the subject of the service (when a vehicle is to receive the service), or any similar information that may allow, assist, aid, or the like, the service provider in locating the user or the user's vehicle. In an example, when a vehicle is to receive the service, and the vehicle is an autonomous vehicle, the notification and/or identifier may also include an authorization for the service provider to operate, take over, or the like, the autonomous systems of the vehicle (e.g., autonomous driving control of the vehicle). In an example, when a service is identified, suggested to the user, and accepted by the user, the identifier assigned to the user or the user's vehicle may be looked up and sent as a part of the notification to the identified service provider.

In an example, the system may match a service provider for the service to be offered based on a number of factors. For example, for a user requiring a ride from the location to a destination, the factors may include the cost of a particular ridesharing service or taxi company to transport the user from the location to the destination. In an example, a factor may be the amount of time required for a particular service provider to get a vehicle to the location to pick up the user. In an example, the system may present the user with several options for service providers capable of fulfilling/providing the service, such as in a web-based application, and allow the user to select the service provider. In an example, the system may automatically select a service provider on the user's behalf. For example, if the user has allowed the system to automatically choose a service provider (such as in a service-level agreement), the system may choose the service provider to perform the service without any additional input or approval by the user.

While examples of a ridesharing or transportation service have been discussed, it is understood that the service may be any service such as a valet parking service, vehicle charging service, vehicle maintenance service, or any service similar to those discussed herein.

Figure 21:
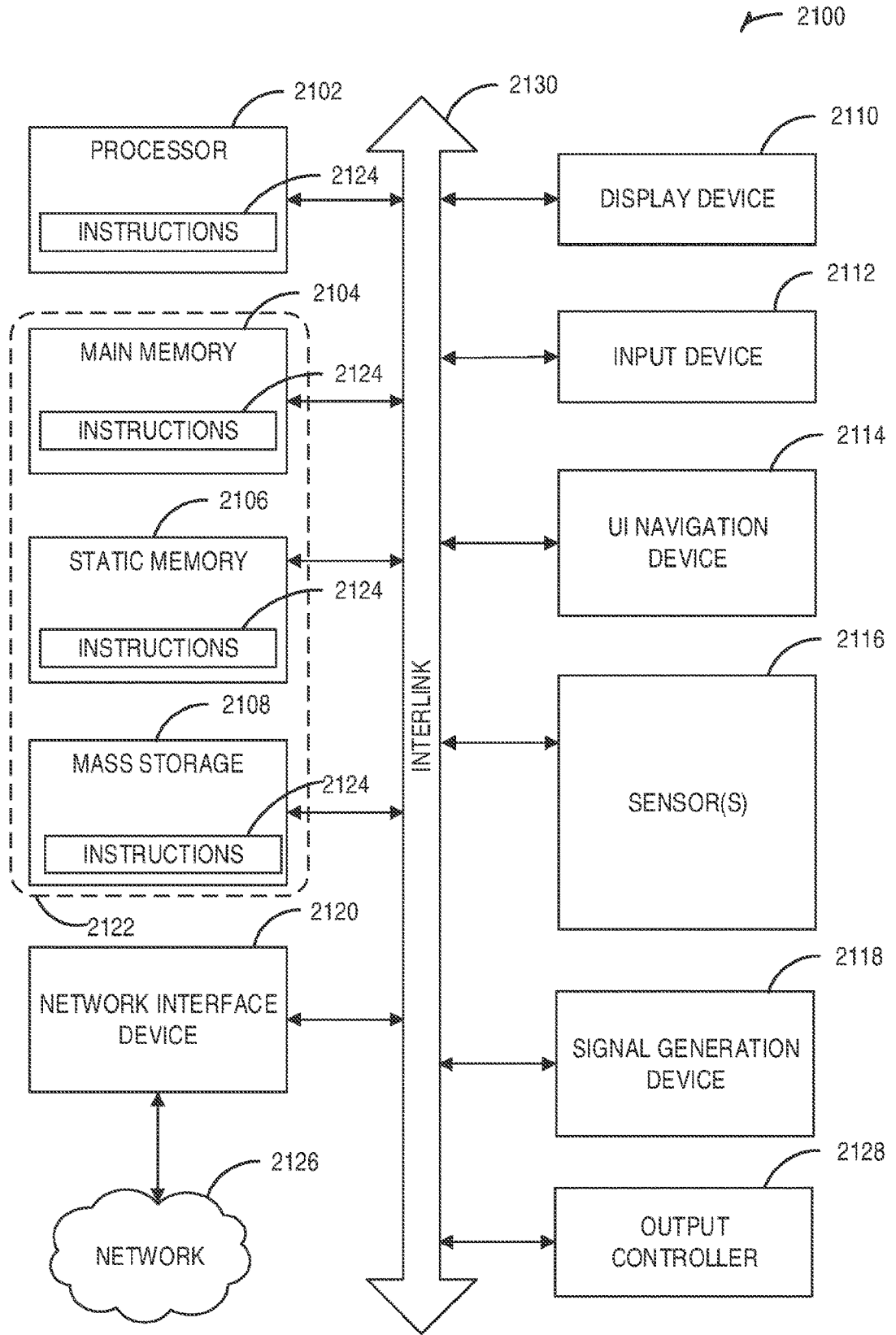
FIG. 21 is a block diagram illustrating an example of a machine upon which one or more embodiments may be implemented, in accordance with some embodiments.

FIG. 21 illustrates a block diagram of an example machine 2100 upon which any one or more of the techniques (e.g., methodologies) discussed herein may perform. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environment. The machine 2100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 2100 may include a hardware processor 2102 (e.g., a central processing unit (CPU), a graphics processing unit (GPU), a hardware processor core, field programmable gate array (FPGA), or any combination thereof), a main memory 2104 and a static memory 2106, some or all of which may communicate with each other via an interlink (e.g., bus) 2130. The machine 2100 may further include a display unit 2110, an alphanumeric input device 2112 (e.g., a keyboard), and a user interface (UI) navigation device 2114 (e.g., a mouse). In an example, the display unit 2110, input device 2112 and UI navigation device 2114 may be a touch screen display. The machine 2100 may additionally include a storage device (e.g., drive unit) 2108, a signal generation device 2118 (e.g., a speaker), a network interface device 2120, and one or more sensors 2116, such as a global positioning system (GPS) sensor, compass, accelerometer, or other sensor. The machine 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2116 may include a machine readable medium 2122 on which is stored one or more sets of data structures or instructions 2124 (e.g., software) embodying or used by any one or more of the techniques or functions described herein. The instructions 2124 may also reside, completely or at least partially, within the main memory 2104, within static memory 2106, or within the hardware processor 2102 during execution thereof by the machine 2100. In an example, one or any combination of the hardware processor 2102, the main memory 2104, the static memory 2106, or the storage device 2116 may constitute machine readable media.

While the machine readable medium 2122 is illustrated as a single medium, the term "machine readable medium" may include a single medium or multiple media (e.g., a centralized or distributed database, and/or associated caches and servers) configured to store the one or more instructions 2124.

The term "machine readable medium" may include any medium that is capable of storing, encoding, or carrying instructions for execution by the machine 2100 and that cause the machine 2100 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device 2120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards), IEEE 802.15.4 family of standards, peer-to-peer (P2P) networks, among others. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 2100, and includes digital or analog communications signals or other intangible medium to facilitate communication of such software.

ADDITIONAL NOTES & EXAMPLES

Example 1 is a networked computing device for location management, comprising: at least one processor; and at least one memory, including instructions stored thereon that when executed by the at least one processor, cause the at least one processor to: obtain data originating from one or more sensors proximate to a location; identify, using a trained activity-based detection model, an activity at the location; perform a determination of a service to be offered at the location, wherein the determination is made based on the identified activity; send a message to a user, the message offering the service at the location; receive an authorization from the user, the authorization accepting the offered service; and in response to the authorization from the user accepting the offered service, cause the service to be implemented at the location, wherein to cause the service to be implemented at the location includes: classifying the service accepted by the user as a service type; matching the service type to a service provider; and sending a notification to the service provider, the notification including the location, an identifier assigned to the user, and the service type.

In Example 2, the subject matter of Example 1 optionally includes wherein the networked computing device is a roadside unit located proximate the location.

In Example 3, the subject matter of any one or more of Examples 1-2 optionally include wherein the instructions further cause the processor to: collect crowd-sourced data from one or more sensors of a plurality of other users; aggregate the data collected from the at least one sensor proximate the location with the crowd-sourced data; and process the aggregated data with the trained activity-based detection model.

In Example 4, the subject matter of Example 3 optionally includes wherein the instructions further cause the processor to: in response to the detection of the activity, convert the aggregated data to a geo-tagged format, wherein the converted geo-tagged data is used to map information on a space at the location with meta-information including at least one of: a timestamp, a vehicle type, an activity type, or a proximity of the space within the location.

In Example 5, the subject matter of any one or more of Examples 3-4 optionally include wherein the location is at least one of a curbside, a parking lot, a parking ramp, or a section of a roadway, and wherein the one or more sensors of the plurality of other users is at least one of a camera, a microphone, or a light detection and ranging (LIDAR) sensor located on a vehicle proximate the location.

In Example 6, the subject matter of any one or more of Examples 3-5 optionally include wherein the service includes an automated valet parking service, wherein the automated valet parking service includes movement of a vehicle from the location to a parking location.

In Example 7, the subject matter of Example 6 optionally includes wherein the instructions further cause the processor to: transmit a parking status message to the vehicle, the parking status message including one or more of, a parking availability status of a parking area, a wait time, or a timestamp; receive a parking request in response to the transmitted parking status message, the parking request including one or more of, a desired parking duration, a desired parking distance, a desired re-parking service, wherein the re-parking service includes moving the vehicle from the parking location to a second parking location, or a desired vehicle service; assign a service identifier to the vehicle; and transmit a designated drop-off location to at least one of the vehicle or the user.

In Example 8, the subject matter of Example 7 optionally includes vehicle-to-grid (V2G) discharge, a car wash, or a vehicle maintenance service.

In Example 9, the subject matter of any one or more of Examples 6-8 optionally include wherein the instructions further cause the processor to: generate, using the aggregated sensor data, a digital environmental model representation of a physical environment of a parking area, the digital environmental model representation including: a number and location of available parking spaces; a current occupancy of all parking spaces; and an identity and location of parked vehicles; generate a route to a destination parking space; transmit the route to at least one of a vehicle or user device associated with the vehicle; determine a second service to be offered; send a second message to the user, the second message offering the user the second service; receive an authorization from the user accepting the second service; and in response to the authorization from the user accepting the second service, cause the second service to be implemented.

In Example 10, the subject matter of Example 9 optionally includes wherein the second service is a vehicle charging service.

In Example 11, the subject matter of Example 10 optionally includes wherein the vehicle charging service is a fast-charging service.

In Example 12, the subject matter of any one or more of Examples 9-11 optionally include wherein the second service is a vehicle retrieval service.

In Example 13, the subject matter of any one or more of Examples 9-12 optionally include vehicle-to-grid (V2G) discharge.

In Example 14, the subject matter of Example 13 optionally includes the instructions further cause the processor to: determine a status of at least one electric vehicle in the parking area, the status including at least one of: a charge level of the at least one electric vehicle, a charge capacity of the at least one electric vehicle, an autonomy level of the at least one electric vehicle, an expected exit time of the at least one electric vehicle, or a pre-selected charging or discharging preference for the at least one electric vehicle; determine a status of an on-site energy storage device located proximate the parking area; determine a current price to sell electricity to an electric grid connected to a charging station located in the parking area and to the on-site energy storage device; and discharge an amount of electrical charge to at least one of the electric grid or the on-site energy storage device according to the pre-selected charging or discharging preference or a received authorization from the user.

In Example 15, the subject matter of any one or more of Examples 9-14 optionally include wherein the second service is a re-parking service.

In Example 16, the subject matter of Example 15 optionally includes wherein to implement the re-parking service the instructions further cause the processor to: receive a re-park interest message from at least one of the vehicle or the user; determine a parking availability status at a second parking area, the second parking area different from the parking area; and transmit a re-park request to the user, the re-park request including one or more of: at least one new parking availability option, at least one new parking availability location, or at least one new parking availability distance.

Example 17 is a method for location management, the method comprising: obtaining data originating from one or more sensors proximate to the location; identifying, using a trained activity-based detection model, an activity at the location; determining a service to be offered at the location, wherein the determination is made based on the identified activity; sending a message to a user, the message offering the service at the location; receiving an authorization from the user, the authorization accepting the offered service; and in response to the authorization from the user accepting the offered service, causing the service to be implemented at the location, wherein causing the service to be implemented at the location includes: classifying the service accepted by the user as a service type; matching the service type to a service provider; and sending a notification to the service provider, the notification including the location, an identifier assigned to the user, and the service type.

In Example 18, the subject matter of Example 17 optionally includes collecting data from at least one crowd-sourced sensor; aggregating the data collected from the at least one sensor proximate the location with data collected from the at least one crowd-sourced sensor; processing the aggregated data with the trained activity-based detection model; and in response to the detection of the activity, converting the aggregated data to a geo-tagged format, wherein the converted geo-tagged data is used to map information on a space at the location with meta-information including at least one of: a timestamp, a vehicle type, an activity type, or a proximity of the space within the location.

In Example 19, the subject matter of Example 18 optionally includes wherein the at least one crowd-sourced sensor is at least one of a camera, a microphone, a light detection and ranging (LIDAR) sensor located on a vehicle proximate the location.

In Example 20, the subject matter of any one or more of Examples 18-19 optionally include wherein the service includes an automated valet parking service, wherein the automated valet parking service includes movement of a vehicle from the location to a parking location.

In Example 21, the subject matter of Example 20 optionally includes transmitting a parking status message to the vehicle, the parking status message including one or more of, a parking availability status of a parking area, a wait time, or a timestamp; receiving a parking request in response to the transmitted parking status message, the parking request including one or more of, a desired parking duration, a desired parking distance, a desired re-parking service, wherein the re-parking service includes moving the vehicle from the parking location to a second parking location, or a desired vehicle service, wherein the desired vehicle service is at least one of: a fast-charging service, a slow-charging service, a vehicle-to-grid (V2G) discharge, a car wash, or a vehicle maintenance service; assigning a service identifier to the vehicle; and transmitting a designated drop-off location to at least one of the vehicle or the user.

In Example 22, the subject matter of any one or more of Examples 20-21 optionally include generating, using the aggregated sensor data, a digital environmental model representation of a physical environment of a parking area, the digital environmental model representation including: a number and location of available parking spaces; a current occupancy of all parking spaces; and an identity and location of parked vehicles; generating a route to a destination parking space; transmitting the route to at least one of a vehicle or user device associated with the vehicle; determining a second service to be offered; sending a second message to the user, the second message offering the user the second service; receiving an authorization from the user accepting the second service; and in response to the authorization from the user accepting the second service, causing the second service to be implemented.

In Example 23, the subject matter of Example 22 optionally includes vehicle-to-grid (V2G) discharge to be implemented includes: determining a status of at least one electric vehicle in the parking area, the status including at least one of: a charge level of the at least one electric vehicle, a charge capacity of the at least one electric vehicle, an autonomy level of the at least one electric vehicle, an expected exit time of the at least one electric vehicle, or a pre-selected charging or discharging preference for the at least one electric vehicle; determining a status of an on-site energy storage device located proximate the parking area; deter-mining a current price to sell electricity to an electric grid connected to a charging station located in the parking area and to the on-site energy storage device; and discharging an amount of electrical charge to at least one of the electric grid or the on-site energy storage device according to the pre-selected charging or discharging preference or a received authorization from the user.

In Example 24, the subject matter of Example 23 optionally includes wherein causing the re-parking service to be implemented includes: receiving a re-park interest message from at least one of the vehicle or the user; determining a parking availability status at a second parking area, the second parking area different from the parking area; and transmitting a re-park request to the user, the re-park request including one or more of: at least one new parking availability option, at least one new parking availability location, or at least one new parking availability distance.

Example 25 is a non-transitory computer-readable medium with instructions stored thereon that, when executed by a processor of a computing system, cause the processor to: obtain data originating from one or more sensors proximate to a location; identify, using a trained activity-based detection model, an activity at the location; perform a determination a service to be offered at the location, wherein the determination is made based on the identified activity; send a message to a user, the message offering the service at the location; receive an authorization from the user, the authorization accepting the offered service; and in response to the authorization from the user accepting the offered service, cause the service to be implemented at the location, wherein to cause the service to be implemented at the location includes: classifying the service accepted by the user as a service type; matching the service type to a service provider; and sending a notification to the service provider, the notification including the location, an identifier assigned to the user, and the service type.

In Example 26, the subject matter of Example 25 optionally includes wherein the instructions further cause the processor to: collect data from at least one crowd-sourced sensor; aggregate the data collected from the at least one sensor proximate the location with data collected from the at least one crowd-sourced sensor; process the aggregated data with the trained activity-based detection model; and in response to the detection of the activity, convert the aggregated data to a geo-tagged format, wherein the converted geo-tagged data is used to map information on a space at the location with meta-information including at least one of: a timestamp, a vehicle type, an activity type, or a proximity of the space within the location.

In Example 27, the subject matter of Example 26 optionally includes wherein the location is at least one of a curbside, a parking lot, a parking ramp, or a section of a roadway, and wherein the one or more sensors of the plurality of other users is at least one of a camera, a microphone, or a light detection and ranging (LIDAR) sensor located on a vehicle proximate the location.

In Example 28, the subject matter of any one or more of Examples 26-27 optionally include wherein the service includes an automated valet parking service, wherein the automated valet parking service includes movement of a vehicle from the location to a parking location.

In Example 29, the subject matter of Example 28 optionally includes wherein the instructions further cause the processor to: transmit a parking status message to the vehicle, the parking status message including one or more of, a parking availability status of a parking area, a wait time, or a timestamp; receive a parking request in response to the transmitted parking status message, the parking request including one or more of, a desired parking duration, a desired parking distance, a desired re-parking service, wherein the re-parking service includes moving the vehicle from the parking location to a second parking location, or a desired vehicle service, wherein the desired vehicle service is at least one of: a fast-charging service, a slow-charging service, a vehicle-to-grid (V2G) discharge, a car wash, or a vehicle maintenance service; assign a service identifier to the vehicle; and transmit a designated drop-off location to at least one of the vehicle or the user.

In Example 30, the subject matter of any one or more of Examples 28-29 optionally include wherein the instructions further cause the processor to: generate, using the aggregated sensor data, a digital environmental model representation of a physical environment of a parking area, the digital environmental model representation including: a number and location of available parking spaces; a current occupancy of all parking spaces; and an identity and location of parked vehicles; generate a route to a destination parking space; transmit the route to at least one of a vehicle or user device associated with the vehicle; determine a second service to be offered; send a second message to the user, the second message offering the user the second service; receive an authorization from the user accepting the second service; and in response to the authorization from the user accepting the second service, cause the second service to be implemented.

In Example 31, the subject matter of Example 30 optionally includes vehicle-to-grid (V2G) discharge to be implemented the processor is further to: determine a status of at least one electric vehicle in the parking area, the status including at least one of: a charge level of the at least one electric vehicle, a charge capacity of the at least one electric vehicle, an autonomy level of the at least one electric vehicle, an expected exit time of the at least one electric vehicle, or a pre-selected charging or discharging preference for the at least one electric vehicle; determine a status of an on-site energy storage device located proximate the parking area; determine a current price to sell electricity to an electric grid connected to a charging station located in the parking area and to the on-site energy storage device; and discharge an amount of electrical charge to at least one of the electric grid or the on-site energy storage device according to the pre-selected charging or discharging preference or a received authorization from the user.

In Example 32, the subject matter of Example 31 optionally includes wherein to cause the re-parking service to be implemented the processor is further to: receive a re-park interest message from at least one of the vehicle or the user; determine a parking availability status at a second parking area, the second parking area different from the parking area; and transmit a re-park request to the user, the re-park request including one or more of: at least one new parking availability option, at least one new parking availability location, or at least one new parking availability distance.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-

868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth®), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources].

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. I.e., some or all features defined for network equipment may be implemented by a UE.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A networked computing device for location management, comprising:

at least one processor; and at least one memory, including instructions stored thereon that when executed by the at least one processor, cause the at least one processor to:

obtain data originating from one or more sensors proximate to a location;

identify, using a trained activity-based detection model, an activity at the location;

perform a determination of a first service to be offered at the location, wherein the first service is a parking service and wherein the determination is made based on the identified activity;

send a message to a user, the message offering the first service at the location;

receive an authorization from the user, the authorization accepting the offered first service;

in response to the authorization from the user accepting the offered first service, cause the first service to be implemented at the location;

determine a second service to be offered, wherein the second service is a non-parking-related service;

send a second message to the user, the second message offering the second service;

receive a second authorization from the user accepting the second service; and in response to receiving the second authorization from the user accepting the offered second service, cause the second service to be implemented, wherein to cause the second service to be implemented includes:

classifying the second service accepted by the user as a non-parking-related service type;

matching the non-parking-related service type to a service provider; and sending a notification to the service provider, the notification including the location, an identifier assigned to the user, and the non-parking-related service type.

2. The networked computing device of claim 1, wherein the instructions further cause the processor to:

collect crowd-sourced data from one or more sensors of a plurality of other users;

aggregate the data collected from the one or more sensors proximate the location with the crowd-sourced data; and process the aggregated data with the trained activity-based detection model.

3. The networked computing device of claim 2, wherein the location is at least one of a curbside, a parking lot, a parking ramp, or a section of a roadway, and wherein the one or more sensors of the plurality of other users is at least one of a camera, a microphone, or a light detection and ranging (LIDAR) sensor located on a vehicle proximate the location.

4. The networked computing device of claim 2, wherein the first service includes an automated valet parking service, wherein the automated valet parking service includes movement of a vehicle between the location and a parking location.

5. The networked computing device of claim 4, wherein the instructions further cause the processor to:

transmit a parking status message to the vehicle, the parking status message including one or more of: a parking availability status of a parking area, a wait time, or a timestamp;

receive a parking request in response to the transmitted parking status message, the parking request including one or more of: a desired parking duration, a desired parking distance, a desired re-parking service, wherein the re-parking service includes moving the vehicle between the parking location and a second parking location, or invoking a desired vehicle service;

assign a service identifier to the vehicle; and transmit a designated drop-off location to at least one of the vehicle or the user.

6. The networked computing device of claim 4, wherein the instructions further cause the processor to:

generate, using the aggregated sensor data, a digital environmental model of a physical environment of a parking area, the digital environmental model including:

a number and location of available parking spaces in the parking area;

a current occupancy of a set of parking spaces in the parking area; and an identity and location of parked vehicles within the parking area;

generate a route to a destination parking space; and transmit the route to at least one of a vehicle or user device associated with the vehicle.

7. The networked computing device of claim 1, wherein;

the second service is provided by an external service provider;

the second service includes a particular second service selected from a plurality of available non-parking-related services; and the second service includes at least one of: a fast-charging service, a car wash, a vehicle maintenance service, a vehicle retrieval service, or a vehicle to grid (V2G) discharge.

8. The networked computing device of claim 7, wherein to implement the V2G discharge, the instructions further cause the processor to:

determine a status of at least one electric vehicle in a parking area, the status including at least one of: a charge level of the at least one electric vehicle, a charge capacity of the at least one electric vehicle, an autonomy level of the at least one electric vehicle, an expected exit time of the at least one electric vehicle, or a pre-selected discharging preference for the at least one electric vehicle;

determine a status of an on-site energy storage device located proximate the parking area;

determine a current price to sell electricity to an electric grid connected to a charging station located in the parking area and to the on-site energy storage device; and discharge an amount of electrical charge to at least one of the electric grid or the on-site energy storage device according to the pre-selected discharging preference or a received authorization from the user.

9. The networked computing device of claim 7, wherein the first service includes a re-parking service, and wherein to implement the re-parking service the instructions further cause the processor to:

receive a re-park interest message from at least one of a vehicle or the user;

determine a parking availability status at a second parking area, the second parking area different from the parking area; and transmit a re-park request to the user, the re-park request including one or more of: at least one new parking availability option, at least one new parking availability location, or at least one new parking availability distance.

10. A method for location management, the method comprising:

obtaining data originating from one or more sensors proximate to a location;

identifying, using a trained activity-based detection model, an activity at the location;

determining a first service to be offered at the location, wherein the first service is a parking service and wherein the determination is made based on the identified activity;

sending a message to a user, the message offering the first service at the location;

receiving an authorization from the user accepting the offered first service;

in response to the authorization from the user accepting the offered first service, causing the first service to be implemented at the location;

determining a second service to be offered, wherein the second service is a non-parking-related service;

sending a second message to the user, the second message offering the second service;

receiving a second authorization from the user accepting the second service; and in response to receiving the second authorization from the user accepting the offered second service, causing the second service to be implemented, wherein causing the second service to be implemented includes:

classifying the second service accepted by the user as a non-parking-related service type;

matching the non-parking-related service type to a service provider; and sending a notification to the service provider, the notification including the location, an identifier assigned to the user, and the non-parking-related service type.

11. The method of claim 10, further comprising:

collecting crowd-sourced data from one or more sensors of a plurality of other users;

aggregating the data collected from the one or more sensors proximate the location with the crowd-sourced data;

processing the aggregated data with the trained activity-based detection model; and in response to the detection of the activity, converting the aggregated data to a geo-tagged format, wherein the converted geo-tagged data is used to map information on a space at the location with meta-information including at least one of: a timestamp, a vehicle type, an activity type, or a proximity of the space within the location.

12. The method of claim 11, wherein the location is at least one of a curbside, a parking lot, a section of a roadway, or a parking ramp, and wherein the one or more sensors of the plurality of other users is at least one of a camera, a microphone, or a light detection and ranging (LIDAR) sensor located on a vehicle proximate the location.

13. The method of claim 11, wherein the first service includes an automated valet parking service, wherein the automated valet parking service includes movement of a vehicle between the location and a parking location.

14. The method of claim 13, further comprising:

transmitting a parking status message to the vehicle, the parking status message including one or more of, a parking availability status of a parking area, a wait time, or a timestamp;

receiving a parking request in response to the transmitted parking status message, the parking request including one or more of, a desired parking duration, a desired parking distance, a desired re-parking service, wherein the re-parking service includes moving the vehicle between the parking location and a second parking location, or invoking a desired vehicle service, wherein the desired vehicle service includes the second service and is provided by an external service provider, and wherein the desired vehicle service is at least one of: a fast-charging service, a slow-charging service, a vehicle-to-grid (V2G) discharge, a car wash, or a vehicle maintenance service;

assigning a service identifier to the vehicle; and transmitting a designated drop-off location to at least one of the vehicle or the user.

15. The method of claim 13, further comprising:

generating, using the aggregated sensor data, a digital environmental model of a physical environment of a parking area, the digital environmental model including:

a number and location of available parking spaces;

a current occupancy of all parking spaces; and an identity and location of parked vehicles;

generating a route to a destination parking space; and transmitting the route to at least one of a vehicle or user device associated with the vehicle.

16. The method of claim 10, wherein the second service is provided by an external service provider, wherein the second service includes a particular second service selected from a plurality of available non-parking-related services, and wherein the second service includes at least one of: a vehicle charging service, wherein the vehicle charging service is a fast-charging service, a car wash, a vehicle maintenance service, a vehicle retrieval service, or vehicle to grid (V2G) discharge, wherein causing the V2G discharge to be implemented includes:

determining a status of at least one electric vehicle in a parking area, the status including at least one of: a charge level of the at least one electric vehicle, a charge capacity of the at least one electric vehicle, an autonomy level of the at least one electric vehicle, an expected exit time of the at least one electric vehicle, or a pre-selected discharging preference for the at least one electric vehicle;

determining a status of an on-site energy storage device located proximate the parking area;

determining a current price to sell electricity to an electric grid connected to a charging station located in the parking area and to the on-site energy storage device; and discharging an amount of electrical charge to at least one of the electric grid or the on-site energy storage device according to the pre-selected discharging preference or a received authorization from the user.

17. The method of claim 16, wherein the first service includes a re-parking service and causing the re-parking service to be implemented includes:

receiving a re-park interest message from at least one of a vehicle or the user;

determining a parking availability status at a second parking area, the second parking area different from the parking area; and transmitting a re-park request to the user, the re-park request including one or more of: at least one new parking availability option, at least one new parking availability location, or at least one new parking availability distance.

18. A non-transitory computer-readable medium with instructions stored thereon that, when executed by a processor of a computing system, cause the processor to:

obtain data originating from one or more sensors proximate to a location;

identify, using a trained activity-based detection model, an activity at the location;

perform a determination of a first service to be offered at the location, wherein the first service is a parking service and wherein the determination is made based on the identified activity;

send a message to a user, the message offering the first service at the location;

receive an authorization from the user accepting the offered first service;

in response to the authorization from the user accepting the offered first service, cause the first service to be implemented at the location;

determine a second service to be offered, wherein the second service is a non-parking-related service;

send a second message to the user, the second message offering the second service;

receive a second authorization from the user accepting the second service; and in response to receiving the second authorization from the user accepting the offered second service, cause the second service to be implemented, wherein to cause the second service to be implemented includes:

classifying the second service accepted by the user as a non-parking-related service type;

matching the non-parking-related service type to a service provider; and sending a notification to the service provider, the notification including the location, an identifier assigned to the user, and the non-parking-related service type.

19. The non-transitory computer-readable medium of claim 18, wherein the instructions further cause the processor to:

collect crowd-sourced data from one or more sensors of a plurality of other users, wherein the one or more sensors of the plurality of other users is at least one of a camera, a microphone, a light detection and ranging (LIDAR) sensor located on a vehicle proximate the location;

aggregate the data collected from one or more sensors proximate the location with the crowd-sourced data;

process the aggregated data with the trained activity-based detection model; and in response to the detection of the activity, convert the aggregated data to a geo-tagged format, wherein the converted geo-tagged data is used to map information on a space at the location with meta-information including at least one of: a timestamp, a vehicle type, an activity type, or a proximity of the space within the location.

20. The non-transitory computer-readable medium of claim 19, wherein the first service includes an automated valet parking service, wherein the automated valet parking service includes movement of a vehicle between the location and a parking location, and wherein the instructions further cause the processor to:

transmit a parking status message to the vehicle, the parking status message including one or more of, a parking availability status of a parking area, a wait time, or a timestamp;

receive a parking request in response to the transmitted parking status message, the parking request including one or more of, a desired parking duration, a desired parking distance, a desired re-parking service, wherein the re-parking service includes moving the vehicle between the parking location and a second parking location, or invoking a desired vehicle service, wherein the desired vehicle service includes the second service and is provided by an external service provider, and wherein the desired vehicle service is at least one of: a fast-charging service, a slow-charging service, a vehicle-to-grid (V2G) discharge, a car wash, or a vehicle maintenance service;

assign a service identifier to the vehicle; and transmit a designated drop-off location to at least one of the vehicle or the user.

* * * * *